United States Patent
Shaw et al.

(10) Patent No.: US 12,521,406 B2
(45) Date of Patent: Jan. 13, 2026

(54) USE OF COMPOUNDS IN THE TREATMENT OF FUNGAL INFECTIONS

(71) Applicant: Basilea Pharmaceutica International AG, Allschwil, Allschwil (CH)

(72) Inventors: Karen Joy Shaw, Poway, CA (US); Michael Hodges, San Diego, CA (US)

(73) Assignee: Basilea Pharmaceutica International AG, Allschwil, Allschwil (CH)

( * ) Notice: Subject to any disclaimer, the term of this patent is extended or adjusted under 35 U.S.C. 154(b) by 657 days.

(21) Appl. No.: 17/908,079

(22) PCT Filed: Mar. 2, 2021

(86) PCT No.: PCT/US2021/020471
§ 371 (c)(1),
(2) Date: Aug. 30, 2022

(87) PCT Pub. No.: WO2021/178406
PCT Pub. Date: Sep. 10, 2021

(65) Prior Publication Data
US 2023/0102036 A1    Mar. 30, 2023

Related U.S. Application Data

(60) Provisional application No. 62/985,274, filed on Mar. 4, 2020.

(51) Int. Cl.
*A61K 31/675* (2006.01)
*A61P 31/10* (2006.01)

(52) U.S. Cl.
CPC ............ *A61K 31/675* (2013.01); *A61P 31/10* (2018.01)

(58) Field of Classification Search
None
See application file for complete search history.

(56) References Cited

U.S. PATENT DOCUMENTS

| | | | | |
|---|---|---|---|---|
| 11,512,079 | B2 * | 11/2022 | Trzoss | A61K 31/437 |
| 12,139,479 | B2 * | 11/2024 | Trzoss | A61K 31/506 |
| 2009/0233883 | A1 | 9/2009 | Matsukura | |
| 2013/0288956 | A1 | 10/2013 | Watanabe et al. | |

FOREIGN PATENT DOCUMENTS

| | | | |
|---|---|---|---|
| EA | 20487 B1 | 11/2014 | |
| WO | 201180266 | 7/2011 | |
| WO | 2019/113542 | 6/2019 | |
| WO | 2021257670 A1 | 12/2021 | |
| WO | 2020/047510 A1 | 3/2022 | |

OTHER PUBLICATIONS

Bellmann et al., "Pharmacokinetics of antifungal drugs: practical implications for optimized treatment of patients," Infection (2017) 45:737-779.
The Canadian Office Action, mailed on Oct. 19, 2023 in the related Canadian Appl. No. 3,174,065.
Hodges et al., "Safety and Pharmacokinetics of Intravenous and Oral Fosmanogepix, a First-in-Class Antifungal Agent, in Healthy Volunteers," Antimicrobial Agents and Chemotherapy, vol. 67, Issue 4, Apr. 2023.
Muijsers et al., "Voriconazole In the Treatment of Invasive Aspergillosis," Drugs, 2002; 62(18), pp. 2655-2664.
Stott et al., "Therapeutic drug monitoring for invasive mould infections and disease: pharmacokinetic and pharmacodynamic considerations," J Antimicrob Chemother 2017; 72 Suppl 1: i12-i18.
Zhao et al., "APX001 Pharmacokinetic/Pharmacodynamic Target Determination against Aspergillus fumigatus in an In Vivo Model of Invasive Pulmonary Aspergillosis," Antimicrobial Agents and Chemotherapy, Apr. 2019, vol. 63, Issue 4, e02372-18.
Alkhazraji, S., et al., 'Fosmanogepix (APX001) Is Effective in the Treatment of Immunocompromised Mice Infected with Invasive Pulmonary Scedosporiosis or Disseminated Fusariosis', Antimicrobial Agents and Chemotherapy (2020), 64(3) e01735-19.
Covel, J., et al., 'The discovery of manogepix/fosmanogepix and other gwt1 inhibitors for the treatment of invasive fungal infections' Medicinal Chemistry Reviews (2019), 54, 221-237.
Gebremariam, T., et al., '726. APX001 (Fosmanogepix) Is Effective in an Immunosuppressed Mouse Model of Rhizopus oryzae Infection', Open Forum Infectious Diseases, vol. 6, Issue Supplement_2, Oct. 2019, pp. S325-S326.
Gintjee, T.J., et al., 'Aspiring Antifungals: Review of Current Antifungal Pipeline Developments', Journal of Fungi (2020), 6(1), 28.
Hodges M.R. et al., 'First-in-human study to assess safety, tolerability and pharmacokinetics of APX001 administered by intravenous infusion to healthy subjects', Open Forum Infectious Diseases, (Sep. 2017) vol. 4, Supp. Supplement 1, pp. S526.
Hodges M.R., et al., 'Phase 1 study to assess safety, tolerability and pharmacokinetics of single and multiple oral doses of APX001 . . . ', Open Forum Infectious Diseases, 2017 vol. 4, Supp. Supplement 1, pp. S534.
Lima, S.L., et al., 'Fungal Cell Wall: Emerging Antifungals and Drug Resistance', Front. Microbiol. 10:2573.
Pfaller M.A., et al., 'In Vitro Activity of APX001A (Manogepix) and Comparator Agents against 1,706 Fungal isolates Collected during an international Surveillance Program in 2017', Antimicrobial Agents and Chemotherapy (2019), 63(8), e00840-19.
Rivero-Menendez, O., et al., 'In vitro activity of APX001A against rare moulds using EUCAST and CLSI methodologies', Journal of Antimicrobial Chemotherapy (2019), 74(5), 1295-1299.
Kharkevich D. A., Pharmacology: textbook.—9th ed., Rev., add. and correct. M: GEOTAR—Media, 2006, 736 p., see p. 653.
Kharkevich D. A., Pharmacology, 10th ed. M: GEOTAR—Media, 2010, pp. 73-74.
Mashkovsky M.D., "Medications", Moscow, "Medicine", 1993, 4.1, p. 8.
Zhulenko V.P., Gorshkov G.I. Pharmacology. M.KolosS, 2008, pp. 34-35.
Official Action and the Search Report issued on Apr. 28, 2023 by the Patent Office of the Russian Federation.

(Continued)

*Primary Examiner* — Aradhana Sasan

(57) ABSTRACT

Described herein is the use of compound 1, an antifungal agent with a novel mechanism of action, in the treatment of fungal infections.

40 Claims, No Drawings

(56) References Cited

OTHER PUBLICATIONS

Translation of Official Action and the Search Report issued on Apr. 28, 2023 by the Patent Office of the Russian Federation.
Rauseo A.M., et al., Hope on the Horizon: Novel Fungal Treatments in Development. Open Forum Infect Dis. Jan. 12, 2020;7(2).
Wei et al., The molecular mechanism of azole resistance in Aspergillus fumgatus: from bedside to bench and back, Journal of Microbiology, vol. 53(2), pp. 91-99 (2015).
Wongkamhla et al., "A case report of Talaromyces marneffei Oropharyngo-laryngitis: a rare manisfestion of Taloromycosis" BMC Infectious Diseases, vol. 19(1), Article 1034, pp. 1-7 (2019).
International Search Report for PCT/US2021/20471, mailed May 4, 2021.
The English translation of the Japanese Office Action, mailed on Mar. 4, 2025, in the related Japanese Appl. No. 2022-552405.
Gebremariam et al., "APX001 Is Effective in the Treatment of Murine Invasive Pulmonary Aspergillosis," Antimicrobial Agents and Chemotherapy, 2019, 63(2)e01713-18, 1-9.
"An Open-label Study of APX001 for Treatment of Patients With Candidemia/ Invasive Candidiasis Caused by Candida Auris (APEX)," ClinicalTrials.gov, NCT04148287, Nov. 1, 2019, 1-7.
The extended European search report, mailed on Feb. 13, 2024, in the related European Patent Appl. No. 21765099.3.
Gebremariam Teclegiorgis et al: "Fosmanogepix (APX001) Is Effective in the Treatment of Pulmonary Murine Mucormycosis Due to Rhizopus arrhizus", Antimicrobial Agents and Chemotherapy, vol. 64, No. 6, Mar. 23, 2020, XP093125119.
Petraitiene Ruta et al: "Efficacy and Pharmacokinetics of Fosmanogepix (APX001) in the Treatment of Candida Endophthalmitis and Hematogenous Meningoencephalitis in Nonneutropenic Rabbits", Antimicrobial Agents and Chemotherapy, vol. 65, No. 3, Feb. 17, 2021, XP093125118.
Badali Hamid et al: "Manogepix, the Active Moiety of the Investigational Agent Fosmanogepix, Demonstrates In Vitro Activity against Members of the Fusarium oxysporum and Fusarium solani Species Complexes", Antimicrobial Agents and Chemotherapy, vol. 65, No. 6, May 18, 2021, XP093125116.

* cited by examiner

USE OF COMPOUNDS IN THE TREATMENT OF FUNGAL INFECTIONS

CROSS-REFERENCE TO RELATED APPLICATIONS

This application is a national phase filing under 35 U.S.C. § 371 of international patent application number PCT/US2021/020471, filed Mar. 2, 2021, which in turn claims the benefit of priority to U.S. Provisional Patent Application Ser. No. 62/985,274, filed Mar. 4, 2020, the disclosure of each of these applications is hereby incorporated by reference in its entirety.

FIELD OF THE INVENTION

Fungi infect humans and are a major cause of human health problems. The present disclosure generally relates to the treatment of fungal infections in humans.

BACKGROUND OF THE INVENTION

Invasive infections due to fungi such as *Aspergillus, Fusarium, Scedosporium* and fungi from the Mucorales order are especially difficult to treat resulting in high mortality rates, even when patients receive standard of care treatment. The frequency of fungi resistant to standard of care antifungal drugs, including the azole and echinocandin classes of drugs and amphotericin B, is increasing. There remains a significant unmet medical need for new broad-spectrum antifungals to treat serious, invasive fungal infections and reduce the existing high morbidity and mortality.

SUMMARY OF THE INVENTION

In one aspect, described herein is a method of treating a fungal infection in a subject, the method comprising administering to a subject with a fungal infection a therapeutically effective amount of compound 1, or a pharmaceutically acceptable salt, solvate, or hydrate thereof; wherein, the fungal infection in the subject is due to *Aspergillus, Fusarium, Scedosporium* and fungi from the Mucorales order or other difficult to treat fungal infections and/or fungal infections due to rare fungi.

In one aspect, described herein is a method of treating a fungal infection in a subject, the method comprising administering to a subject with a fungal infection a therapeutically effective amount of compound 1:

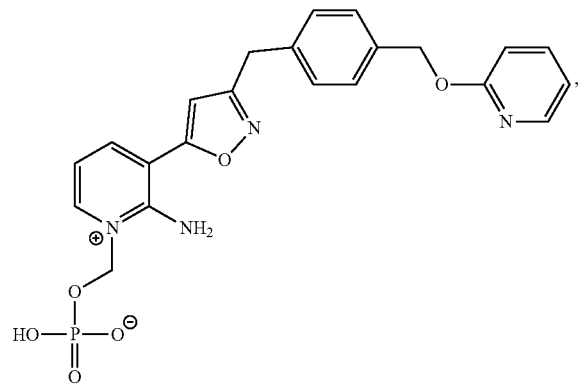

or a pharmaceutically acceptable salt, solvate, or hydrate thereof;

wherein, the fungal infection in the subject is caused by *Aspergillus* spp., *Scedosporium* spp., *Fusarium* spp., *Paecilomyces* spp., *Purpureocillium* spp., *Dematiaceous* spp., *Rhizopus, Mucor* spp., *Lichtheimia* spp., *Cunninghamella* spp., *Acremonium* spp., *Rasamsonia* spp *Schizophyllum* spp., *Trichoderma* spp., *Alternaria* spp., *Cladophialophora* spp., *Cladosporium* spp., *Exophiala* spp., *Fonsecaea* spp., *Lomentospora* spp., *Phialophora* spp., *Scopulariopsis* spp., *Magnusiomyces* (*Geotrichum*) spp., *Trichosporon* spp., *Malassezia* spp., *Saprochaete* spp., *Kodamaea* spp., *Rhodotorula* spp., *Saccharomyces* spp., *Pseudozyma* spp., *Sporobolomyces* spp., *Lacazia* spp., *Emmonsia* spp., *Wickerhamomyces* (*Pichia*) spp., *Emergomyces* spp., *Talaromyces* spp., or *Emmonsia*-like fungi, or a combination thereof;

the therapeutically effective amount of compound 1 provides a steady state 24-hr Area Under the Concentration-Time Curve ($AUC_{0-24}$) of compound 1A in the subject that is greater than about 150 μg×hr/mL of compound 1A:

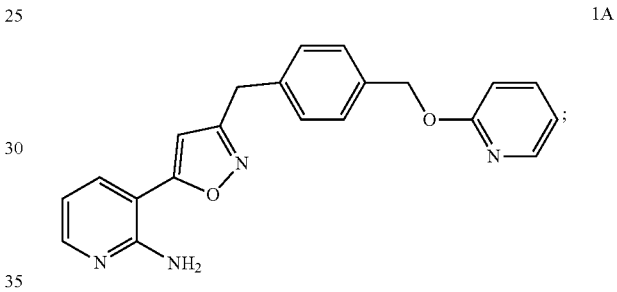

and the administration of compound 1, or a pharmaceutically acceptable salt, solvate, or hydrate thereof, to the subject comprises a treatment regimen comprising the daily administration of compound 1, or a pharmaceutically acceptable salt, solvate, or hydrate thereof, for at least about 4 weeks.

In some embodiments, the therapeutically effective amount of compound 1 provides a steady state 24-hr Area Under the Concentration-Time Curve ($AUC_{0-24}$) of at least about 180 μg×hr/mL of compound 1A. In some embodiments, the therapeutically effective amount of compound 1 provides a steady state 24-hr Area Under the Concentration-Time Curve ($AUC_{0-24}$) of at least about 200 μg×hr/mL of compound 1A. In some embodiments, the therapeutically effective amount of compound 1 provides a steady state 24-hr Area Under the Concentration-Time Curve ($AUC_{0-24}$) of at least about 250 μg×hr/mL of compound 1A.

In some embodiments, the fungal infection is a mold infection. In some embodiments, the mold infection is caused by *Aspergillus* spp., *Scedosporium* spp., *Fusarium* spp., *Paecilomyces* spp., *Purpureocillium* spp., *Dematiaceous* spp., or Mucorales fungi, or a combination thereof. In some embodiments, the mold infection is caused *by A. flavus, A niger, A. fumigatus, A. terreus, S. apiospermum, S. boydii, S. dehoogii, F. solani, P. lilacinus, P. variotii,* or *Rhizopus oryzae,* or a combination thereof. In some embodiments, the mold infection is caused by *Aspergillus* spp. In some embodiments, the mold infection is caused by *A. fumigatus.* In some embodiments, the *A. fumigatus* strain is a Cyp51 or Fks1 mutant strain. In some embodiments, the *A. fumigatus* strain is AF293, AF41, EMFR S678P, F11628, AF72, or F14532.

In some embodiments, the fungal infection is a yeast infection. In some embodiments, the yeast infection is caused by *Magnusiomyces* (*Geotrichum*) spp., *Trichosporon* spp., *Malassezia* spp., *Saprochaete* spp., *Kodamaea* spp., *Rhodotorula* spp., *Saccharomyces* spp., *Pseudozyma* spp., *Sporobolomyces* spp., *Exophiala* spp., *Lacazia* spp., *Emmonsia* spp., or *Wickerhamomyces* (*Pichia*) spp., or a combination thereof In some embodiments, the yeast infection is caused by *G. clavatum, T asahii, T mucoides, T mycotoxinivorans, M furfur, R. mucilaginosa*, or *S. cerevisiae*, or a combination thereof.

In some embodiments, the fungal infection is a dimorphic fungal infection. In some embodiments, the dimorphic fungal infection is caused by *Emergomyces* spp., *Talaromyces* spp., or Emmonsia-like fungi, or a combination thereof.

In some embodiments, the yeast infection is caused by *T. marneffei*.

In some embodiments, the subject is immunocompromised. In some embodiments, the subject is infected with HIV/AIDS or has cancer. In some embodiments, the cancer is acute myeloid leukemia or acute lymphoid leukemia. In some embodiments, the subject has neutropenia. In some embodiments, the subject has lymphopenia. In some embodiments, the subject is undergoing or has undergone cancer chemotherapy treatment. In some embodiments, the subject is undergoing or has undergone corticosteroid treatment. In some embodiments, the subject is undergoing or has undergone tumor necrosis factor (TNF) inhibitor treatment. In some embodiments, the subject is an organ transplant recipient. In some embodiments, the subject is a hematopoietic stem-cell transplant recipient. In some embodiments, the subject has graft-versus-host disease.

In some embodiments, the fungal infection is superficial, locally invasive, or disseminated throughout the subject. In some embodiments, the fungal infection is a cutaneous infection, lung infection, sinus infection, central nervous system infection, brain infection, eye infection, heart infection, kidney infection, gastrointestinal tract infection, stomach infection, pelvic infection, blood infection, or a combination thereof.

In another aspect, described herein is a method of treating a fungal disease or condition in a subject, the method comprising administering to a subject with a fungal disease or condition a therapeutically effective amount of compound 1:

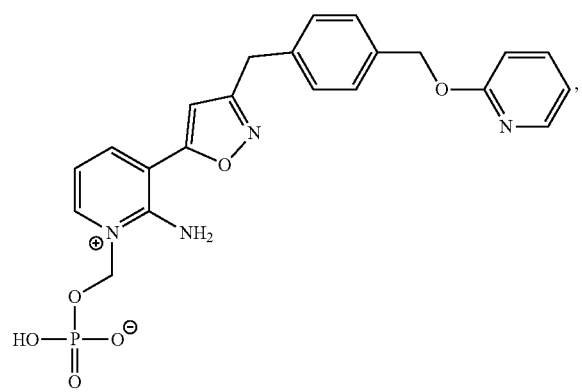

or a pharmaceutically acceptable salt, solvate, or hydrate thereof;

wherein, the fungal disease or condition in the subject is aspergillosis, fusariosis, scedosporiosis, or mucormycosis, or a combination thereof;

the therapeutically effective amount of compound 1 provides a steady state 24-hr Area Under the Concentration-Time Curve ($AUC_{0-24}$) of compound 1A in the subject that is greater than about 150 μg×hr/mL of compound 1A:

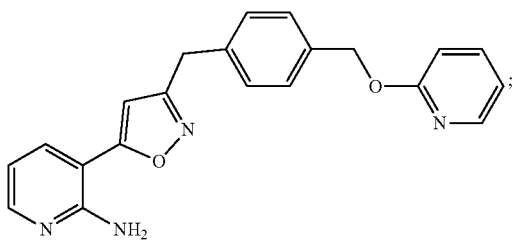

and the administration of compound 1, or a pharmaceutically acceptable salt, solvate, or hydrate thereof, to the subject comprises a treatment regimen comprising the daily administration of compound 1, or a pharmaceutically acceptable salt, solvate, or hydrate thereof, for at least about 4 weeks.

In some embodiments, the therapeutically effective amount of compound 1 provides a steady state 24-hr Area Under the Concentration-Time Curve ($AUC_{0-24}$) of at least about 200 μg×hr/mL of the compound 1A. In some embodiments, the therapeutically effective amount of compound 1 provides a steady state 24-hr Area Under the Concentration-Time Curve ($AUC_{0-24}$) of at least about 250 μg×hr/mL of the compound 1A.

In some embodiments, the subject is immunocompromised.

In some embodiments, the subject is infected with HIV/AIDS or has cancer. In some embodiments, the cancer is acute myeloid leukemia or acute lymphoid leukemia. In some embodiments, the subject has neutropenia. In some embodiments, the subject has lymphopenia. In some embodiments, the subject is undergoing or has undergone cancer chemotherapy treatment. In some embodiments, the subject is undergoing or has undergone corticosteroid treatment. In some embodiments, the subject is undergoing or has undergone TNF inhibitor treatment. In some embodiments, the subject is an organ transplant recipient. In some embodiments, the subject is a hematopoietic stem-cell transplant recipient. In some embodiments, the subject has graft-versus-host disease.

In some embodiments, the fungal disease or condition is allergic bronchopulmonary aspergillosis, aspergillus sinusitis, azole-resistant *A. fumigatus*, aspergilloma, pulmonary aspergillosis, invasive aspergillosis, cutaneous aspergillosis, fusariosis, scedosporiosis, rhinocerebral mucormycosis, pulmonary mucormycosis, disseminated mucormycosis, abdominal-pelvic mucormycosis, gastric mucormycosis, cutaneous mucormycosis, or a combination thereof.

In some embodiments, the treatment regimen comprises a loading dose of compound 1, or a pharmaceutically acceptable salt, solvate, or hydrate thereof, and a maintenance dose of compound 1, or a pharmaceutically acceptable salt, solvate, or hydrate thereof.

In some embodiments, the treatment regimen comprises a loading dose of compound 1, or a pharmaceutically acceptable salt, solvate, or hydrate thereof, of about 2000 mg compound 1, or a pharmaceutically acceptable salt, solvate, or hydrate thereof In some embodiments, the loading dose of compound 1, or a pharmaceutically acceptable salt, solvate, or hydrate thereof, is administered to the subject by intravenous (I.V.) infusion. In some embodiments, the loading dose of compound 1, or a pharmaceutically acceptable salt, solvate, or hydrate thereof, comprises the administration of two doses of compound 1, or a pharmaceutically acceptable salt, solvate, or hydrate thereof, to the subject by intravenous (I.V.) infusion. In some embodiments, each loading dose of compound 1, or a pharmaceutically acceptable salt, solvate, or hydrate thereof, is administered to the subject by intravenous (I.V.) infusion over about 30 minutes to about 4 hours.

In some embodiments, each dose of the loading dose comprises about 1000 mg of compound 1, or a pharmaceutically acceptable salt, solvate, or hydrate thereof In some embodiments, the loading dose comprises administration of about 1000 mg of compound 1, or a pharmaceutically acceptable salt, solvate, or hydrate thereof, to the subject by intravenous (I.V.) infusion followed by a second administration of about 1000 mg of compound 1, or a pharmaceutically acceptable salt, solvate, or hydrate thereof, to the subject by intravenous (I.V.) infusion within about 24 hours of the first infusion.

In some embodiments, the maintenance dose is administered once daily starting on the second day of treatment. In some embodiments, the maintenance dose comprises once daily administration of about 600 mg to about 1500 mg of compound 1, or a pharmaceutically acceptable salt, solvate, or hydrate thereof. In some embodiments, the maintenance dose of compound 1, or a pharmaceutically acceptable salt, solvate, or hydrate thereof is administered over a period of about 30 minutes to about 4 hours by I.V. infusion starting on the second, third, or fourth day of treatment. In some embodiments, the maintenance dose of about 600 mg to about 1200 mg compound 1, or a pharmaceutically acceptable salt, solvate, or hydrate thereof is administered over a period of about 30 minutes to about 4 hours by I.V. infusion starting on the second, third, or fourth day of treatment. In some embodiments, the maintenance dose of compound 1, or a pharmaceutically acceptable salt, solvate, or hydrate thereof is administered orally to the subject starting on the second, third, or fourth day of treatment.

In some embodiments, the maintenance dose of about 800 mg to about 1000 mg compound 1, or a pharmaceutically acceptable salt, solvate, or hydrate thereof is administered orally once daily to the subject starting on the second, third, or fourth day of treatment.

In some embodiments, starting on the second, third, or fourth day of treatment: a) about 600 mg to about 900 mg of compound 1, or a pharmaceutically acceptable salt, solvate, or hydrate thereof is administered over a period of about 30 minutes to about 3 hours by I.V. infusion; or b) about 800 mg to about 1000 mg of compound 1, or a pharmaceutically acceptable salt, solvate, or hydrate thereof is administered orally once daily.

In some embodiments, starting on the second day of treatment, about 600 mg to about 900 mg of compound 1, or a pharmaceutically acceptable salt, solvate, or hydrate thereof is administered over a period of about 30 minutes to about 3 hours by I.V. infusion; and starting on the fourth day of treatment: a) about 600 mg to about 900 mg of compound 1, or a pharmaceutically acceptable salt, solvate, or hydrate thereof is administered over a period of about 30 minutes to about 3 hours by I.V. infusion; or b) about 800 mg to about 1000 mg of compound 1, or a pharmaceutically acceptable salt, solvate, or hydrate thereof is administered orally once daily.

In some embodiments, the compound 1, or a pharmaceutically acceptable salt, solvate, or hydrate thereof is administered in combination with an additional therapeutic agent. In some embodiments, the additional therapeutic agent is an antifungal agent. In some embodiments, the antifungal agent is a polyene antifungal agent, an azole antifungal agent, an allylamine antifungal agent, and an echinocandin antifungal agent. In some embodiments, the antifungal agent is amphotericin B, candicidin, filipin, hamycin, natamycin, nystatin, rimocidin, bifonazole, butoconazole, clotrimazole, econazole, fenticonazole, isavuconazole, ketoconazole, luliconazole, miconazole, omoconazole, oxiconazole, sertaconazole, sulconazole, tioconazole, albaconazole, efinaconazole, epoxiconazole, fluconazole, isavuconazole, itraconazole, posaconazole, propiconazole, ravuconazole, terconazole, voriconazole, abafungin, amorolfin, butenafine, naftifine, or terbinafine, anidulafungin, caspofungin, micafungin, rezafungin, or a pharmaceutically acceptable salt of any of the preceding antifungal agents.

In another aspect, described herein is a method of treating a fungal infection or mold infection in a subject, the method comprising administering to a subject with a fungal infection or mold infection a therapeutically effective amount of compound 1:

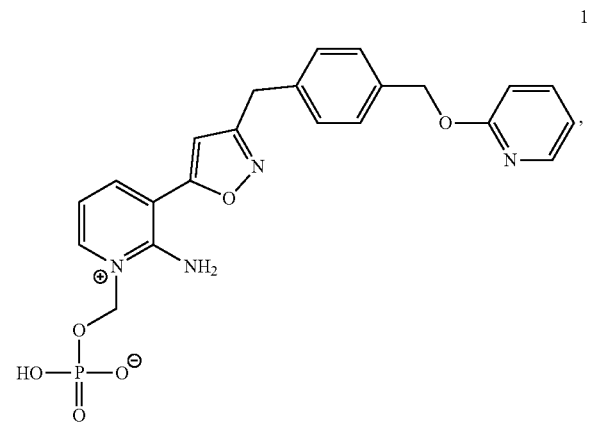 [SMILES: Nc1c(-c2cc(Cc3ccc(COc4ccccn4)cc3)no2)ccc[n+]1COP(=O)([O-])O]

1 or a pharmaceutically acceptable salt, solvate, or hydrate thereof;

wherein, the fungal infection in the subject is caused by *Aspergillus* spp., *Scedosporium* spp., *Fusarium* spp., *Paecilomyces* spp., *Purpureocillium* spp., *Dematiaceous* spp., *Rhizopus, Mucor* spp., *Lichtheimia* spp., *Cunninghamella* spp., *Acremonium* spp., *Rasamsonia* spp., *Scedosporium* spp., *Schizophyllum* spp., *Trichoderma* spp., *Alternaria* spp., *Cladophialophora* spp., *Cladosporium* spp., *Exophiala* spp., *Fonsecaea* spp., *Lomentospora* spp., *Phialophora* spp., *Scopulariopsis* spp., *Magnusiomyces* (*Geotrichum*) spp., *Trichosporon* spp., *Malassezia* spp., *Saprochaete* spp., *Kodamaea* spp., *Rhodotorula* spp., *Saccharomyces* spp., *Pseudozyma* spp., *Sporobolomyces* spp., *Exophiala* spp., *Lacazia* spp., *Emmonsia* spp., *Wickerhamomyces* (*Pichia*) spp., *Emergomyces* spp., *Talaromyces* spp., or Emmonsia-like fungi, or a combination thereof;

the therapeutically effective amount of compound 1 provides a steady state 24-hr Area Under the Concentration-Time Curve (AUC$_{0-24}$) of compound 1A in the subject of at least about 150 µg×hr/mL of compound 1A:

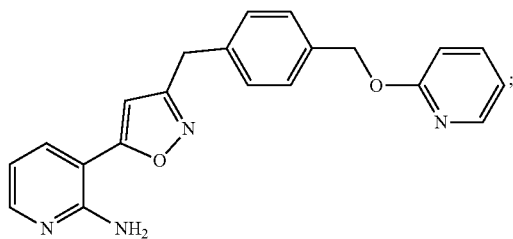

wherein the subject has a resistance to, contradiction, intolerance of, or lack of clinical response to standard of care antifungal therapy; and wherein the administration of compound 1, or a pharmaceutically acceptable salt, solvate, or hydrate thereof, to the subject comprises a treatment regimen comprising the daily administration of compound 1, or a pharmaceutically acceptable salt, solvate, or hydrate thereof, for at least about 4 weeks.

In some embodiments, the therapeutically effective amount of compound 1 provides a steady state 24-hr Area Under the Concentration-Time Curve (AUC$_{0-24}$) of at least 200 µg×hr/mL of the compound 1A. In some embodiments, the therapeutically effective amount of compound 1 provides a steady state 24-hr Area Under the Concentration-Time Curve (AUC$_{0-24}$) of at least 250 µg×hr/mL of the compound 1A.

In some embodiments, the standard of care antifungal therapy comprises an azole antifungal, an allylamine antifungal agent, echinocandin antifungal, or polyene antifungal. In some embodiments, the standard of care antifungal therapy comprises amphotericin B, candicidin, filipin, hamycin, natamycin, nystatin, rimocidin, bifonazole, butoconazole, clotrimazole, econazole, fenticonazole, isavuconazole, ketoconazole, luliconazole, miconazole, omoconazole, oxiconazole, sertaconazole, sulconazole, tioconazole, albaconazole, efinaconazole, epoxiconazole, fluconazole, isavuconazole, itraconazole, posaconazole, propiconazole, ravuconazole, terconazole, voriconazole, abafungin, amorolfin, butenafine, naftifine, or terbinafine, anidulafungin, caspofungin, micafungin, rezafungin, or a pharmaceutically acceptable salt of any of the preceding antifungal agents.

In some embodiments, the fungal infection is a mold infection. In some embodiments, the mold infection is caused by *Aspergillus* spp., *Scedosporium* spp., *Fusarium* spp., *Paecilomyces* spp., *Purpureocillium* spp., *Dematiaceous* spp., or Mucorales fungi, or a combination thereof. In some embodiments, the mold infection is caused by *A. flavus*, *A niger*, *A. fumigatus*, *A. terreus*, *S. apiospermum*, *S. boydii*, *S. dehoogii*, *F. solani*, *P. lilacinus*, *P. variotii*, or *Rhizopus oryzae*, or a combination thereof. In some embodiments, the mold infection is caused by *Aspergillus* spp. In some embodiments, the mold infection is caused by *A. fumigatus*. In some embodiments, the *A. fumigatus* strain is a Cyp51 or Fks1 mutant strain. In some embodiments, the *A. fumigatus* strain is AF293, AF41, EMFR S678P, F11628, AF72, or F14532.

In some embodiments, the fungal infection is a yeast infection. In some embodiments, the yeast infection is caused by *Magnusiomyces* (*Geotrichum*) spp., *Trichosporon* spp., *Malassezia* spp., *Saprochaete* spp., *Kodamaea* spp., *Rhodotorula* spp., *Saccharomyces* spp., *Pseudozyma* spp., *Sporobolomyces* spp., *Exophiala* spp., *Lacazia* spp., *Emmonsia* spp., or *Wickerhamomyces* (*Pichia*) spp., or a combination thereof In some embodiments, the yeast infection is caused by *G. clavatum*, *T asahii*, *T mucoides*, *T mycotoxinivorans*, *M furfur*, *R. mucilaginosa*, or *S. cerevisiae*, or a combination thereof.

In some embodiments, the fungal infection is a dimorphic fungal infection. In some embodiments, the dimorphic fungal infection is caused by *Emergomyces* spp., *Talaromyces* spp., or Emmonsia-like fungi, or a combination thereof.

In some embodiments, the yeast infection is caused by *T. marneffei*.

In some embodiments, the subject is immunocompromised. In some embodiments, the subject is infected with HIV/AIDS or has cancer. In some embodiments, the cancer is acute myeloid leukemia or acute lymphoid leukemia. In some embodiments, the subject has neutropenia. In some embodiments, the subject has lymphopenia. In some embodiments, the subject is undergoing or has undergone cancer chemotherapy treatment. In some embodiments, the subject is undergoing or has undergone corticosteroid treatment. In some embodiments, the subject is undergoing or has undergone TNF inhibitor treatment. In some embodiments, the subject is an organ transplant recipient. In some embodiments, the subject is a hematopoietic stem-cell transplant recipient. In some embodiments, the subject has graft-versus-host disease.

In some embodiments, the fungal infection or mold infection is superficial, locally invasive, or disseminated throughout the subject. In some embodiments, the fungal infection is a cutaneous infection, lung infection, sinus infection, central nervous system infection, brain infection, eye infection, heart infection, kidney infection, gastrointestinal tract infection, stomach infection, pelvic infection, blood infection, or a combination thereof.

In some embodiments, the fungal infection comprises a fungal disease or condition that is allergic bronchopulmonary aspergillosis, allergic sinusitis, azole-resistant *A. fumigatus*, aspergilloma, pulmonary aspergillosis, invasive aspergillosis, cutaneous aspergillosis, fusariosis, scedosporiosis, rhinocerebral mucormycosis, pulmonary mucormycosis, disseminated mucormycosis, abdominal-pelvic mucormycosis, gastric mucormycosis, cutaneous mucormycosis, or a combination thereof.

In some embodiments, the treatment regimen comprises a loading dose of compound 1, or a pharmaceutically acceptable salt, solvate, or hydrate thereof, and a maintenance dose of compound 1, or a pharmaceutically acceptable salt, solvate, or hydrate thereof.

In some embodiments, the treatment regimen comprises a loading dose of compound 1, or a pharmaceutically acceptable salt, solvate, or hydrate thereof, of about 2000 mg compound 1, or a pharmaceutically acceptable salt, solvate, or hydrate thereof. In some embodiments, the loading dose of compound 1, or a pharmaceutically acceptable salt, solvate, or hydrate thereof, is administered to the subject by intravenous (I.V.) infusion. In some embodiments, the loading dose of compound 1, or a pharmaceutically acceptable salt, solvate, or hydrate thereof, comprises the administration of two doses of compound 1, or a pharmaceutically acceptable salt, solvate, or hydrate thereof, to the subject by intravenous (I.V.) infusion. In some embodiments, each loading dose of compound 1, or a pharmaceutically acceptable salt, solvate, or hydrate thereof, is administered to the subject by intravenous (IV.) infusion over about 30 minutes to about 4 hours. In some embodiments, each dose of the loading dose comprises about 1000 mg of compound 1, or a pharmaceutically acceptable salt, solvate, or hydrate thereof. In some embodiments, the loading dose comprises administration of about 1000 mg of compound 1, or a pharmaceutically acceptable salt, solvate, or hydrate thereof, to the subject by intravenous (IV.) infusion followed by a second administration of about 1000 mg of compound 1, or a pharmaceutically acceptable salt, solvate, or hydrate thereof, to the subject by intravenous (IV.) infusion within about 24 hours of the first infusion.

In some embodiments, the maintenance dose is administered once daily starting on the second day of treatment.

In some embodiments, the maintenance dose comprises once daily administration of about 600 mg to about 1500 mg of compound 1, or a pharmaceutically acceptable salt, solvate, or hydrate thereof.

In some embodiments, the maintenance dose of compound 1, or a pharmaceutically acceptable salt, solvate, or hydrate thereof is administered over a period of about 30 minutes to about 4 hours by I.V. infusion starting on the second, third, or fourth day of treatment. In some embodiments, the maintenance dose of about 600 mg to about 1200 mg compound 1, or a pharmaceutically acceptable salt, solvate, or hydrate thereof is administered over a period of about 30 minutes to about 4 hours by I.V. infusion starting on the second, third, or fourth day of treatment.

In some embodiments, the maintenance dose of compound 1, or a pharmaceutically acceptable salt, solvate, or hydrate thereof is administered orally to the subject starting on the second, third, or fourth day of treatment.

In some embodiments, the maintenance dose of about 800 mg to about 1000 mg compound 1, or a pharmaceutically acceptable salt, solvate, or hydrate thereof is administered orally once daily to the subject starting on the second, third, or fourth day of treatment.

In some embodiments, starting on the second, third, or fourth day of treatment: a) about 600 mg to about 900 mg of compound 1, or a pharmaceutically acceptable salt, solvate, or hydrate thereof is administered over a period of about 30 minutes to about 3 hours by I.V. infusion; orb) about 800 mg to about 1000mg of compound 1, or a pharmaceutically acceptable salt, solvate, or hydrate thereof is administered orally once daily.

In some embodiments, starting on the second day of treatment, about 600 mg to about 900 mg of compound 1, or a pharmaceutically acceptable salt, solvate, or hydrate thereof is administered over a period of about 30 minutes to about 3 hours by I.V. infusion; and starting on the fourth day of treatment: a) about 600 mg to about 900 mg of compound 1, or a pharmaceutically acceptable salt, solvate, or hydrate thereof is administered over a period of about 30 minutes to about 3 hours by I.V. infusion; orb) about 800 mg to about 1000 mg of compound 1, or a pharmaceutically acceptable salt, solvate, or hydrate thereof is administered orally once daily.

In some embodiments, the compound 1, or a pharmaceutically acceptable salt, solvate, or hydrate thereof is administered in combination with an additional therapeutic agent.

In some embodiments, the treatment regimen comprises the daily administration of compound 1, or a pharmaceutically acceptable salt, solvate, or hydrate thereof, for about 4 weeks to about 12 weeks. In some embodiments, the treatment regimen comprises the daily administration of compound 1, or a pharmaceutically acceptable salt, solvate, or hydrate thereof, for about 4 weeks to about 6 weeks.

In some embodiments, the treatment regimen increases the chances of survival for the subject, decreases galactomannan levels in the subject, decreases β-d-glucan levels in the subject, or a combination thereof.

Articles of manufacture, which include packaging material, compound 1, or a pharmaceutically acceptable salt, solvate, or hydrate thereof, within the packaging material, and a label that indicates that compound 1, or a pharmaceutically acceptable salt, solvate, or hydrate thereof, is used for treating a fungal infection, or for the prevention or amelioration of one or more symptoms of a fungal infection are provided.

Other objects, features and advantages of the compounds, methods and compositions described herein will become apparent from the following detailed description. It should be understood, however, that the detailed description and the specific examples, while indicating specific embodiments, are given by way of illustration only, since various changes and modifications within the spirit and scope of the instant disclosure will become apparent to those skilled in the art from this detailed description.

DETAILED DESCRIPTION

A growing need exists for novel and versatile therapies for the treatment of fungal infections in patients. The increase in the occurrence of drug-resistant fungal strains increases, especially in the context of common species of *Aspergillus* spp., as well as rare and hard-to-treat molds including *Fusarium* spp., *Scedosporium* spp., and molds from the Mucorales order, heightens the need for new antifungal therapies.

Invasive infections due to *Aspergillus, Fusarium, Scedosporium* and molds from the Mucorales order are especially difficult to treat resulting in high mortality rates (50-80%), even when patients receive standard of care treatment. The frequency of fungi resistant to standard of care antifungal drugs, including the azole and echinocandin classes of drugs and amphotericin B, is increasing. Thus, there remains a significant unmet medical need for a new broad-spectrum antifungal to treat serious, invasive fungal infections and reduce the existing high morbidity and mortality.

Aspergillosis is an infection caused by *Aspergillus*, a common mold (a type of fungus) that lives indoors and outdoors. Most people breathe in *Aspergillus* spores every day without getting sick. However, people with weakened immune systems or with lung diseases are at a higher risk of developing health problems due to *Aspergillus*. The types of health problems caused by *Aspergillus* include allergic reactions, lung infections, and infections in other organs.

In people with particularly poor immune systems, the fungus can transfer from the lung through the blood stream to the brain or to other organs, including the eye, the heart, the kidneys and the skin. Usually this is a bad sign as the condition is more severe and the person has a higher risk of death. However, sometimes infection of the skin enables the diagnosis to be made earlier and treatment to be started sooner.

When disease does occur, it takes several forms. The types of diseases caused by *Aspergillus* are varied, ranging from an allergy-type illness to life-threatening generalized infections. The severity of aspergillosis is determined by various factors, but one of the most important is the state of the immune system of the person.

Allergic bronchopulmonary aspergillosis (ABPA) is a condition which produces an allergy to *Aspergillus* spores. It is quite common in asthmatics; up to 2.5% of adult asthmatics might get this at some time during their lives. ABPA is also common in cystic fibrosis patients, as they reach adolescence and adulthood. In the long term ABPA can lead to permanent lung damage (fibrosis or bronchiectasis) if untreated.

Aspergilloma occurs when the fungus grows within a body cavity, such as a paranasal sinus cavity, or a cavity of a particular organ, such as the lung. Any lung disease which causes cavities, such as tuberculosis or sarcoidosis, can leave a person open to developing an aspergilloma in the lung. The spores penetrate the cavity and germinate, forming a fungal ball within the cavity. In some people, cavities in the lung are formed by *Aspergillus*, and no fungal ball is present. The fungus secretes toxic and allergic products, which may make the person feel ill.

Chronic pulmonary aspergillosis occurs when an Aspergillus infection causes cavities in the lungs, and can be a long-term (3 months or more) condition. One or more fungal balls (aspergillomas) may also be present in the lungs.

Aspergillus disease can happen in the sinuses leading to *Aspergillus* sinusitis. Just as in the lungs, *Aspergillus* can cause the three diseases—allergic sinusitis, a fungal ball, or invasive aspergillosis. Surgical drainage of the sinus usually cures the problem, unless the *Aspergillus* has entered the sinuses deep inside the skull. In this latter scenario, antifungal drug therapy is used in combination with surgery.

When patients have damaged immune systems, for example, in the case of leukemia or a bone marrow transplant, *Aspergillus* sinusitis is more serious. In these cases, the sinusitis is a form of invasive aspergillosis. The symptoms include fever, facial pain, nasal discharge, and headaches. The diagnosis is made by finding the fungus in fluid or tissue from the sinuses and with scans. Surgery is done in most cases, as it is important to find out what is exactly wrong and is often helpful in eradicating the fungus. Treatment with antifungal medicines is essential.

Azole-Resistant *Aspergillus fumigatus* occurs when the fungus becomes resistant to certain azole antifungal agents used to treat it.

Invasive aspergillosis is the most severe form of aspergillosis and usually affects people who have weakened immune systems. Individuals who have weakened immune systems include, but is not limited to, individuals who have had an organ transplant or a stem cell transplant, individuals with prolonged neutropenia, individuals receiving cancer chemotherapy, individuals receiving high-dose corticosteroids, or individuals receiving broad-spectrum antibiotics or individuals receiving any other immunosuppressing therapy. Invasive aspergillosis most commonly starts in the lungs and then spreads via the blood stream to infect other organs, such as, without limitation, the heart, brain, kidneys, liver, and skin. Invasive aspergillosis can result in death due to suffer severe life-threatening complications such as shock, delirium, massive bleeding from the lungs, inflammation of the trachea and bronchi, organ failure, intracranial bleeding, brain, meningitis and stroke. For patients with invasive aspergillosis survival is improved the earlier the diagnosis is made. Unfortunately, there is no good single diagnostic test. Often treatment is started when the condition is only suspected. This condition is usually clinically diagnosed in a person with low defenses such as bone marrow transplant, low white cells after cancer treatment, AIDS, or major burns. There is also a rare inherited condition that gives people low immunity (chronic granulomatous disease), which puts affected people at moderate risk.

In some embodiments, invasive aspergillosis occurs in patients with chronic obstructive pulmonary disease (COPD).

Invasive pulmonary aspergillosis (IPA) is an increasingly common opportunistic fungal infection usually occurring in patients with neutropenia and/or corticosteroid exposure. The lungs are involved in about 85% of cases of invasive aspergillosis. Factors that influence whether patients acquire this life-threatening infection include: severity of neutropenia, duration of neutropenia, neutrophil dysfunction (such as, but not limited to, chronic granulomatous disease, severe combined immunodeficiency (SCID), late stage AIDS, or chronic leukaemia), corticosteroid dose and duration, other immunosuppressive agents such as methotrexate and anti-TNF inhibitors, inoculum (such as, but not limited to, exposure to dust, compost or moldy materials), prior or current pulmonary disease (which increases risk), genetic markers such as high IL-10 producers, and severe systemic illness (such as, but not limited to, liver dysfunction). Additional agents/drugs which can weaken the immune system include: cyclosporine, tacrolimus, sirolimus, everolimus, interleukin inhibitors, pomalidomide, omalizumab, azathioprine, lenalidomide, and thalidomide.

Interleukin inhibitors include, without limitation, rilonacept, canakinumab, anakinra, reslizumab, brodalumab, ustekinumab, benralizumab, mepolizumab, tocilizumab, ixekizumab, dupilumab, secukinumab, tildrakizumab, guselkumab, sarilumab, basiliximab, risankizumab, siltuximab, daclizumab, and daclizumab.

Cutaneous (skin) aspergillosis occurs when *Aspergillus* enters the body through a break in the skin (for example, after surgery or a burn wound) and causes infection, usually in people who have weakened immune systems. In some embodiments, cutaneous aspergillosis can also occur if invasive aspergillosis spreads to the skin from somewhere else in the body, such as the lungs.

Other forms of aspergillosis include, chronic cavitary pulmonary aspergillosis, subacute invasive pulmonary aspergillosis, *Aspergillus* nodule, and infections of the nail beds, eyes, skin, sinuses or ear canals.

Scedosporiosis is an infection caused by fungi from the genus *Scedosporium*, which includes two hyphomycetes of emerging medical importance, *Scedosporium apiospermum* and *Scedosporium prolificans*.

*Fusarium* species cause a broad spectrum of infections in humans, including superficial, locally invasive, and disseminated infections. The clinical form of fusariosis depends largely on the immune status of the host and the mode of entry, with superficial and localized disease occurring mostly in immunocompetent patients and invasive and disseminated disease affecting immunocompromised patients. Risk factors for severe fusariosis include prolonged neutropenia and T-cell immunodeficiency, especially in hematopoietic stem cell transplant recipients with severe graft-versus-host disease. The most frequent presentation of disseminated fusariosis is a combination of characteristic cutaneous lesions and positive blood cultures, with or without lung or sinus involvement. The prognosis is poor and is determined largely by degree of immunosuppression and extent of infection, with virtually a 100% death rate among persistently neutropenic patients with disseminated disease.

In some embodiments, infections are clinically suspected on the basis of a constellation of clinical and laboratory findings.

*Fusarium* species are widely distributed in soil, subterranean and aerial plant parts, plant debris, and other organic substrates and are present in water worldwide as part of water structure biofilms. The widespread distribution of *Fusarium* species may be attributed to their ability to grow on a wide range of substrates and their efficient mechanisms for dispersal.

More than 50 species of *Fusarium* have been identified, including plant and animal pathogens, but a few cause human infections. Twelve species were associated with infection; *Fusarium solani* was the most frequent, followed by *Fusarium oxysporum, Fusarium verticillioidis,* and *Fusarium moniliforme*. Other infecting species included *Fusarium dimerum, Fusarium proliferatum, Fusarium chlamidosporum, Fusarium sacchari, Fusarium nygamai, Fusarium napiforme, Fusarium antophilum,* and *Fusarium vasinfectum*. *Fusarium solani* is also the most frequent pathogen in fusarial keratitis and, with *F. oxysporum*, accounts for most cases of onychomycosis caused by *Fusarium* species.

Among immunocompetent hosts, keratitis and onychomycosis are the most common infections. Immunocompromised patients at high risk for fusariosis are those with prolonged and profound neutropenia and/or severe T-cell immunodeficiency (Boutati, E. I., et al. 1997. Blood 90:999-1008). Unlike infection in the normal host, fusariosis in the immunocompromised population is typically invasive and disseminated.

The principal mode of entry for *Fusarium* spp. is the airways, followed by the skin at site of tissue breakdown and possibly the mucosal membranes. Airborne fusariosis is thought to be acquired by the inhalation of airborne fusarial conidia, as suggested by the occurrence of sinusitis and/or pneumonia in absence of dissemination. The role of skin as a portal of entry is supported by the development of infection following skin breakdowns due to trauma (automobile accidents, bamboo), burns or onychomycosis in normal hosts, and the development of cellulitis (typically at sites of tissue breakdown such as toes and fingers), which may remain localized or lead to disseminated infection in immunocompromised patients (Nucci, M., et al., 2003. Cancer 98:315-319).

A striking characteristic of fusariosis, as opposed to aspergillosis, is the high frequency of positive blood cultures, mostly in the context of disseminated disease. Occasionally fungemia is the only manifestation of fusariosis, usually in absence of neutropenia, among patients with central venous catheters. Antifungal treatment and catheter removal result in cure in most such cases.

Disseminated disease is the most frequent and challenging clinical form of fusariosis in immunocompromised patients, accounting for approximately 70% of all cases of fusariosis in this population. Patients at risk for disseminated fusariosis include those with acute leukemia and prolonged and profound neutropenia and patients undergoing HSCT.

The most frequent pattern of disseminated disease is a combination of cutaneous lesions and positive blood cultures, with or without involvement at other sites (sinuses, lungs, and others).

Many different species of fungi can cause mucormycosis. They belong to a large group of molds called Mucorales. These molds include *Rhizopus, Rhizomucor,* and *Mucor*. Each species causes similar symptoms.

These molds are common in the environment and usually do not cause infection. Mucormycosis typically occurs when one of the following is present: diabetes is not controlled well; the immune system is weakened by drugs (such as corticosteroids or drugs that suppress the immune system) or by leukemia or other diseases or conditions that decrease the number of white blood cells in the blood; deferoxamine is used to treat iron overload. Additional agents/drugs which can weaken the immune system include: cyclosporine, tacrolimus, sirolimus, everolimus, interleukin inhibitors, pomalidomide, omalizumab, azathioprine, lenalidomide, and thalidomide.

In some embodiments, mucormycosis can be classified in rhinocerebral, pulmonary and disseminated, abdominal-pelvic and gastric, and cutaneous or chronic subcutaneous diseases. Common features of rhinocerebral, pulmonary, and disseminated diseases include blood vessel invasion, hemorrhagic necrosis, thrombosis, and a rapid fatal outcome.

Rhinocerebral mucormycosis is more often associated with uncontrolled diabetes mellitus and ketoacidosis than malignancies or deferoxamine therapy. Inhaled spores colonize at first the upper turbinates and paranasal sinuses and cause sinusitis. Depending on the underlying disease, in some embodiments the fungus rapidly invades the central nervous system, causing symptoms like an altered mental state, progression to coma, and death within a few days.

Pulmonary mucormycosis is commonly seen in patients with leukemia, lymphoma, solid organ or bone marrow transplantation, and diabetes but is occasionally reported also in apparently healthy subjects. Disease manifestations vary from a localized nodular lesion to cavitary lesions and dissemination; in the latter case, massive hemoptysis generally occurs. Crude mortality is lower in cases of isolated lesions than in severe pulmonary and disseminated diseases.

In some embodiments, gastrointestinal disease is a manifestation of mucormycosis, and it is mainly associated with malnutrition in presence of predisposing factors, especially in children with amoebic colitis, typhoid, and pellagra. In the most severe cases, the disease can be characterized by ulceration of the mucosa and invasion of blood vessels with subsequent production of necrotic ulcers, this form of the disease is fatal.

In some embodiments, cutaneous mucormycosis is a primary disease following skin barrier break or occurs as a consequence of hematogenous dissemination from other sites, and the outcome of the disease is strictly dependent on the patients' conditions. In some embodiments, primary cutaneous mucormycosis involves the subcutaneous tissue as well as the fat, muscle and fascial layers.

The need for improved treatment of invasive fungal diseases remains high, particularly with the growing number of immunocompromised patients, such as acute myeloid leukemia (AML) patients, non-Hodgkin's lymphoma patients, and solid organ transplant recipients, who are at particular risk for developing these infections and in whom treatment can be complex. Species of *Candida* and *Aspergillus* are well recognized as the two major causes of fungal diseases in these patients, although other emerging fungi, such as rare molds (e.g., *Fusarium* spp., *Scedosporium* spp., and Mucorales fungi), are contributing to the need to find new and better strategies for managing these infections. Existing antifungal agents can be difficult to use, are often poorly tolerated, have drug-drug-interactions (DDIs), may not be available as IV and PO formulations, or have become increasingly ineffective due to the rise of drug resistant fungal strains.

Compound 1

Many patients have limited or no antifungal treatment options due to documented/anticipated resistance, contraindication, intolerance, or lack of clinical response to standard of care (SOC) antifungal therapy. Under this setting, compound 1 has advantages over SOC antifungal therapy and thus supports its preliminary investigation for the treatment of invasive mold infections (IMIs).

Compound 1, a prodrug rapidly converted in vivo by phosphatases to the microbiologically active moiety compound 1A, is a broad-spectrum antifungal agent in for the treatment of invasive fungal infections by both intravenous and oral routes of administration. Compound 1 is a pro-drug with a labile phosphate moiety. The phosphate moiety improves the aqueous solubility of the drug substance at a higher pH range, but also has limited stability.

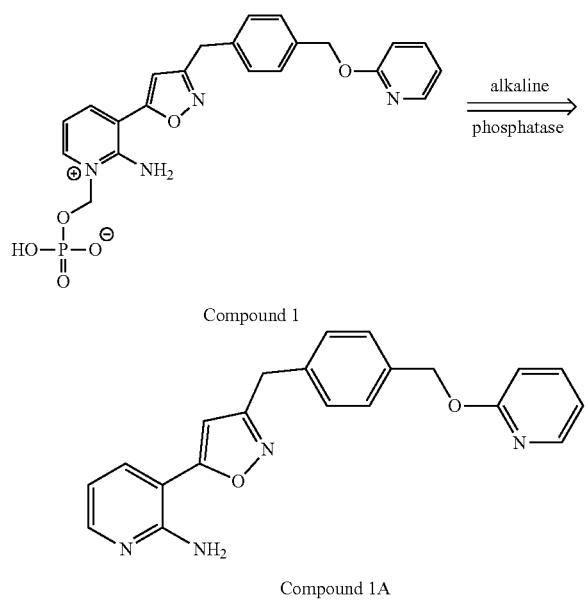

Compound 1A inhibits the fungal glycosylphosphatidylinositol (GPI)-anchored wall transfer protein 1 (GWT1) enzyme, a highly conserved inositol acylase that catalyzes an early step in the GPI-anchored biosynthesis pathway. This inhibition has pleiotropic effects on the fungal cell due to inhibition of cell wall mannoprotein localization, which comprises cell wall integrity, biofilm formation, germ tube formation, and fungal growth. Compound 1A does not inhibit phosphatidylinositol glycan anchor biosynthesis class W (PIGW) protein, the closest mammalian ortholog of the fungal GWT1 protein consistent with the potential for a significant target-based therapeutic window.

Compound 1A has demonstrated broad in vitro antifungal activity against *Candida* spp., *Cryptococcus* spp., *Aspergillus* spp., *Scedosporium* spp., *Fusarium* spp., and some Mucorales fungi, including activity against azole- and echinocandin-resistant strains. In 5-fluorouracil immunosuppressed mice with IMIs (*Aspergillus fumigatus*, *Scedosporium prolificans*, and *Fusarium solani*), compound 1 or 1A demonstrated statistically significantly improved survival rates and reduced pulmonary fungal colony counts. In cyclophosphamide and cortisone acetate immunosuppressed mice with IMIs (*A. fumigatus, S. apiospermum, F. solani,* and *Rhizopus* spp.), compound 1 demonstrated statistically significantly improved survival rates and reduced fungal burden.

Additionally, Compound 1A has demonstrated antifungal activity against a broad range of clinical isolates of rare mold infections and rare yeast infections, including activity against a range of *Aspergillus* spp., *Scedosporium* spp., *Fusarium* spp., *Paecilomyces* spp., *Purpureocillium* spp., *Dematiaceous* spp., Mucorales fungi, *Magnusiomyces* (*Geotrichum*) spp., *Trichosporon* spp., *Malassezia* spp., *Saprochaete* spp., *Kodamaea* spp., *Rhodotorula* spp., *Saccharomyces* spp., *Pseudozyma* spp., *Sporobolomyces* spp., *Exophiala* spp., *Lacazia* spp., *Emmonsia* spp., *Wickerhamomyces* (*Pichia*) spp., *Emergomyces* spp., *Talaromyces* spp., or Emmonsia-like fungi. These rare mold and rare yeast species generally pose no threat to healthy subjects, but can lead to invasive mold infections in immunocompromised individuals.

In some embodiments, Compound 1 or Compound 1A is used in the treatment of a variety of fungal infections caused by Candida, Cryptococcus, Blastomyces, Histoplasma, Coccidioides, or a combination thereof.

In some embodiments, Compound 1 or Compound 1A is used in the treatment of a variety of mold and rare mold infections. In some embodiments, the mold or rare mold is caused by *Aspergillus* spp., Mucorales fungi, Hyalohyphomycete fungi, Phaeohyphomycete fungi, or a combination thereof.

*Aspergillus* spp. include *A. flavus, A niger, A. fumigatus, A. terreus.*

Mucorales fungi include *Rhizopus* spp., *Mucor* spp., *Lichtheimia* spp., *Cunninghamella* spp.

Hyalohyphomycete fungi include *Acremonium* spp., *Fusarium* spp., *Paecilomyces* spp., *Rasamsonia,* spp., *Scedosporium* spp., *Schizophyllum* spp., *Trichoderma* spp.

Phaeohyphomycete fungi include *Alternaria* spp., *Cladophialophora* spp., *Cladosporium* spp., *Exophiala* spp., *Fonsecaea* spp., *Lomentospora* spp., *Phialophora* spp., *Scopulariopsis* spp.

*Scedosporium* spp. include *S. apiospermum, S. boydii, S. dehoogii.*

*Fusarium* spp. include *F. solani.*

*Rhizopus* spp. include *Rhizopus oryzae.*

In some embodiments, Compound 1 or Compound 1A is used in the treatment of infections caused by *Aspergillus* spp., *Scedosporium* spp., *Fusarium* spp., *Paecilomyces* spp., *Purpureocillium* spp., *Dematiaceous* spp., or Mucorales fungi, or a combination thereof; including *A. flavus, A niger, A. fumigatus, A. terreus, S. apiospermum, S. boydii, S. dehoogii, F. solani, P. lilacinus, P. variotii,* and *Rhizopus oryzae.*

In some embodiments, Compound 1A is used in the treatment of a variety of yeast and rare yeast infections, including those caused by *Magnusiomyces* (*Geotrichum*) spp., *Trichosporon* spp., *Malassezia* spp., *Saprochaete* spp., *Kodamaea* spp., *Rhodotorula* spp., *Saccharomyces* spp., *Pseudozyma* spp., *Sporobolomyces* spp., *Exophiala* spp., *Lacazia* spp., *Emmonsia* spp., or *Wickerhamomyces* (*Pichia*) spp., or a combination thereof; including *G. clavatum, T asahii, T mucoides, T mycotoxinivorans, M furfur, R. mucilaginosa,* or *S. cerevisiae.*

In some embodiments, Compound 1A is used in the treatment of a variety of additional fungal infections, including dimorphic fungal infections caused by *Emergomyces* spp., *Talaromyces* spp., or Emmonsia-like fungi, or a combination thereof; including *T. marneffei.*

Pharmacokinetic-pharmacodynamic (PK-PD) studies in immunosuppressed mice with invasive infections caused by *A. fumigatus* have shown that the area under the concentration-time curve (AUC) divided by the minimal effective concentration (MEC) ratio is the driver of efficacy. The dose regimen employed in this study provides a steady state AUC≥200 µg×hr/mL, which is associated with efficacy (colony count and survival benefit) in immunocompromised mice with invasive pulmonary aspergillosis (IPA). Additionally, formal PK-PD studies demonstrated that the dose regimen has favorable probability of target attainment (PTA) for the majority of isolates anticipated to be encountered in this study.

In Phase 1 clinical studies of compound 1, the safety, tolerability, and PK of single and multiple ascending doses administered intravenously (IV) and orally (PO) have been studied. To date, a total of 197 healthy volunteers and 21 patients with acute myeloid leukemia (AML) have received compound 1 across 5 Phase 1 studies. The duration of the multiple-dose regimens in these studies was 7, 14, and 42 days (6 weeks).

Compound 1 may have potential benefits compared to the current SOC for treatment of invasive infections caused by *Aspergillus* spp. or rare molds. Furthermore, compound 1 has a differentiated safety profile, is available as IV and PO formulation, and may have fewer DDIs than the SOC treatments.

Patients with azole-resistant mold infections, including azole-resistant *A. fumigatus* and some rare molds (e.g., *Fusarium* spp., *Scedosporium* spp., species of the Mucorales order) typically receive IV treatment with a polyene. Polyenes have been associated with risk of nephrotoxicity, electrolyte imbalance, and infusion reactions which can be limiting in patient care. Compound 1 has broad-spectrum antifungal activity with coverage against azole-resistant molds, and has the potential to be safer and easier to use compared to polyene.

Compound 1 may provide an advantage over a polyene for the treatment of "breakthrough" infections in patients receiving prophylaxis with mold active triazoles. Compound 1 has the potential to provide antifungal coverage for *A. fumigatus* and rare molds, without the potential for polyene-induced toxicities. With wide tissue penetration, compound 1 may provide a benefit for the treatment of patients with invasive fungal infections in the eye and central nervous system.

Compound 1 may provide a benefit to patients with invasive fungal infections who are unable to receive treatment with a mold-active azole due to intolerance, toxicity, or clinically significant drug interactions. Compound 1 has the potential to provide broad-spectrum antifungal coverage, without the risk of hepatic or other azole-associated toxicities, and is expected to be less likely to induce clinically significant drug interactions.

Compound 1 has a novel mechanism of action with broad spectrum activity against *Candida* spp. (yeast) and *Aspergillus* spp. (mold), including activity against polyene and azole-resistant strains of *Aspergillus* spp. Compound 1 has demonstrated efficacy in a number of animal models of IMIs, including *Aspergillus* spp., *Fusarium* spp., *Scedosporium* spp., and species from the Mucorales order. Compound 1 is available in both IV and PO formulations with wide-tissue distribution, including the eye and central nervous system, and has been safe and well tolerated with a favorable safety and DDI profile that is differentiated from SOC antifungal therapy. Compound 1 has the potential to be used as a first-line agent for the treatment of IMIs through a unique mechanism of action. Thus, compound 1 has potential to fill an unmet need for patients with limited or no antifungal treatment options due to documented/anticipated resistance, contraindication, intolerance, or lack of clinical response to standard of care (SOC) antifungal therapy.

Certain Terminology

Unless otherwise stated, the following terms used in this application have the definitions given below. The use of the term "including" as well as other forms, such as "include", "includes," and "included," is not limiting. The section headings used herein are for organizational purposes only and are not to be construed as limiting the subject matter described.

The term "acceptable" with respect to a formulation, composition or ingredient, as used herein, means having no persistent detrimental effect on the general health of the subject being treated.

The term "pharmaceutically acceptable salt" in reference to a compound refers to a salt of the compound, which does not cause significant irritation to a mammal to which it is administered and does not substantially abrogate the biological activity and properties of the compound. *Handbook of Pharmaceutical Salts: Properties, Selection and Use.* International Union of Pure and Applied Chemistry, Wiley-VCH 2002. S. M. Berge, L. D. Bighley, D. C. Monkhouse, J. Pharm. Sci. 1977, 66, 1-19. P. H. Stahl and C. G. Wermuth, editors, *Handbook of Pharmaceutical Salts: Properties, Selection and Use,* Weinheim/Zürich:Wiley-VCH/VHCA, 2002. In some embodiments, pharmaceutical salts typically are more soluble and more rapidly soluble in stomach and intestinal juices than non-ionic species and so are useful in solid dosage forms. Furthermore, because their solubility often is a function of pH, selective dissolution in one or another part of the digestive tract is possible and this capability, in some cases, is manipulated as one aspect of delayed and sustained release behaviors. Also, because the salt-forming molecule, in some cases, is in equilibrium with a neutral form, passage through biological membranes, in some cases, is adjusted.

In some embodiments, pharmaceutically acceptable salts are generally prepared by reacting the free base with a suitable organic or inorganic acid or by reacting the acid with a suitable organic or inorganic base. The term may be used in reference to any compound of the present invention. Representative salts include the following salts: acetate, benzenesulfonate, benzoate, bicarbonate, bisulfate, bitartrate, borate, bromide, calcium edetate, camsylate, carbonate, chloride, clavulanate, citrate, dihydrochloride, edetate, edisylate, estolate, esylate, fumarate, gluceptate, gluconate, glutamate, glycollylarsanilate, hexylresorcinate, hydrabamine, hydrobromide, hydrochloride, hydroxynaphthoate, iodide, isethionate, lactate, lactobionate, laurate, malate, maleate, mandelate, mesylate, methylbromide, methylnitrate, methylsulfate, monopotassium maleate, mucate, napsylate, nitrate, N-methylglucamine, oxalate, pamoate (embonate), palmitate, pantothenate, phosphate/diphosphate, polygalacturonate, potassium, salicylate, sodium, stearate, subacetate, succinate, tannate, tartrate, teoclate, tosylate, triethiodide, trimethylammonium, and valerate. In some embodiments, when an acidic substituent is present, such as —$CO_2H$, ammonium, morpholinium, sodium, potassium, barium, or calcium salts, and the like are formed. In some embodiments, when a basic group is present, such as amino, or a basic heteroaryl ring, such as pyridyl, an acidic addition salt is formed, such as hydrochloride salt, hydrobromide salt, phosphate salt, sulfate salt, trifluoroacetate salt, trichloroacetate salt, acetate salt, oxalate salt, maleate salt, pyruvate salt, malonate salt, succinate salt, citrate salt, tartarate salt, fumarate salt, mandelate salt, benzoate salt, cinnamate salt, methanesulfonate salt, ethanesulfonate salt, picrate salt, and the like. Additional pharmaceutically acceptable salt forms of therapeutic agents are listed in Berge, et al., *Journal of Pharmaceutical Sciences,* Vol. 66(1), pp. 1-19 (1977).

The term "modulate" as used herein, means to interact with a target either directly or indirectly so as to alter the activity of the target, including, by way of example only, to enhance the activity of the target, to inhibit the activity of the target, to limit the activity of the target, or to extend the activity of the target.

The term "modulator" as used herein, refers to a molecule that interacts with a target either directly or indirectly. The interactions include, but are not limited to, the interactions of an agonist, partial agonist, an inverse agonist, antagonist, degrader, or combinations thereof. In some embodiments, a modulator is an antagonist. In some embodiments, a modulator is a degrader.

The terms "administer," "administering", "administration," and the like, as used herein, refer to the methods that in some cases enable delivery of compounds or compositions to the desired site of biological action. These methods include, but are not limited to oral routes, intraduodenal routes, and parenteral routes (including intravenous, intraperitoneal, intravascular, or infusion). Those of skill in the art are familiar with administration techniques that can be employed with the compounds and methods described herein. In some embodiments, the compounds and compositions described herein are administered orally. In some embodiments, the compounds and compositions described herein are administered intravenously. In some embodiments, the compounds and compositions described herein are administered by intravenous infusion.

The terms "co-administration" or the like, as used herein, are meant to encompass administration of the selected therapeutic agents to a single patient and are intended to include treatment regimens in which the agents are administered by the same or different route of administration or at the same or different time.

The terms "effective amount" or "therapeutically effective amount," as used herein, refer to a sufficient amount of an agent or a compound being administered, which will relieve to some extent one or more of the symptoms of the disease or condition being treated. The result includes reduction and/or alleviation of the signs, symptoms, or causes of a disease, or any other desired alteration of a biological system. For example, an "effective amount" for therapeutic uses is the amount of the composition comprising a compound as disclosed herein required to provide a clinically significant decrease in disease symptoms. An appropriate "effective" amount in any individual case is optionally determined using techniques, such as a dose escalation study.

The terms "enhance" or "enhancing," as used herein, means to increase or prolong either in potency or duration a desired effect. Thus, in regard to enhancing the effect of therapeutic agents, the term "enhancing" refers to the ability to increase or prolong, either in potency or duration, the effect of other therapeutic agents on a system. An "enhancing-effective amount," as used herein, refers to an amount adequate to enhance the effect of another therapeutic agent in a desired system.

The term "pharmaceutical combination" as used herein, means a product that results from the mixing or combining of more than one active ingredient and includes both fixed and non-fixed combinations of the active ingredients. The term "fixed combination" means that the active ingredients, e.g., a compound described herein, or a pharmaceutically acceptable salt, solvate, or hydrate thereof, and a co-agent, are both administered to a patient simultaneously in the form of a single entity or dosage. The term "non-fixed combination" means that the active ingredients, e.g., a compound described herein, or a pharmaceutically acceptable salt, solvate, or hydrate thereof, and a co-agent, are administered to a patient as separate entities either simultaneously, concurrently or sequentially with no specific intervening time limits, wherein such administration provides effective levels of the two compounds in the body of the patient. The latter also applies to cocktail therapy, e.g., the administration of three or more active ingredients.

The terms "kit" and "article of manufacture" are used as synonyms.

The term "subject" or "patient" encompasses mammals. Examples of mammals include, but are not limited to, any member of the mammalian class: humans, non-human primates such as chimpanzees, and other apes and monkey species. In one aspect, the mammal is a human.

The terms "treat," "treating" or "treatment," as used herein, include alleviating, abating or ameliorating at least one symptom of a disease or condition, preventing additional symptoms, inhibiting the disease or condition, e.g., arresting the development of the disease or condition, relieving the disease or condition, causing regression of the disease or condition, relieving a condition caused by the disease or condition, or stopping the symptoms of the disease or condition either prophylactically and/or therapeutically.

As used herein the term "about" means within ±10% of the value.

Pharmaceutical Compositions

In some embodiments, the compounds described herein are formulated into pharmaceutical compositions. Pharmaceutical compositions are formulated in a conventional manner using one or more pharmaceutically acceptable inactive ingredients that facilitate processing of the active compounds into preparations that are used pharmaceutically. Proper formulation is dependent upon the route of administration chosen. A summary of pharmaceutical compositions described herein is found, for example, in Remington: The Science and Practice of Pharmacy, Nineteenth Ed (Easton, Pa.: Mack Publishing Company, 1995); Hoover, John E., Remington's Pharmaceutical Sciences, Mack Publishing Co., Easton, Pa. 1975; Liberman, H. A. and Lachman, L., Eds., Pharmaceutical Dosage Forms, Marcel Decker, New York, N.Y., 1980; and Pharmaceutical Dosage Forms and Drug Delivery Systems, Seventh Ed. (Lippincott Williams & Wilkins1999), herein incorporated by reference for such disclosure.

In some embodiments, the compounds described herein are administered in combination with pharmaceutically acceptable carriers, excipients or diluents, in a pharmaceutical composition. Administration of the compounds and compositions described herein is carried out by any method that enables delivery of the compounds to the site of action. These methods include, though are not limited to delivery via enteral routes (including oral, gastric or duodenal feeding tube) or parenteral routes (injection or infusion), although the most suitable route, in some cases, depends upon, for example, the condition and disease of the recipient.

In some embodiments, compound 1 or a pharmaceutically acceptable salt, solvate, or hydrate thereof, is included within a pharmaceutical composition. As used herein, the term "pharmaceutical composition" refers to a liquid or solid composition that contains a pharmaceutically active ingredient (e.g., compound 1 or a pharmaceutically acceptable salt, solvate, or hydrate thereof) and at least a carrier, where none of the ingredients is generally biologically undesirable at the administered quantities.

Pharmaceutical compositions incorporating compound 1, or a pharmaceutically acceptable salt, solvate, or hydrate thereof, take any physical form that is pharmaceutically acceptable. In some embodiments, pharmaceutical compositions described herein are in a suitable form for oral administration. In one embodiment of such pharmaceutical compositions, a therapeutically effective amount of compound 1, or a pharmaceutically acceptable salt, solvate, or hydrate thereof, is incorporated.

In some embodiments, conventional inert ingredients and manner of formulating the pharmaceutical compositions are used. In some embodiments, known methods of formulating the pharmaceutical compositions are followed. All of the usual types of compositions are contemplated, including, but not limited to, tablets, capsules, and solutions. The amount of compound 1, or a pharmaceutically acceptable salt, solvate, or hydrate thereof, however, is best defined as the effective amount, that is, the amount of compound 1, or a pharmaceutically acceptable salt, solvate, or hydrate thereof, that provides the desired dose to the subject in need of such treatment.

In some cases, capsules are prepared by mixing compound 1, or a pharmaceutically acceptable salt, solvate, or hydrate thereof, with a suitable diluent and filling the proper amount of the mixture in capsules. The usual diluents include inert powdered substances such as starch of many different kinds, powdered cellulose, especially crystalline, and microcrystalline cellulose, sugars such as fructose, mannitol, and sucrose, grain flours, and similar edible powders.

In some cases, tablets are prepared by direct compression, by wet granulation, or by dry granulation. Their formulations usually incorporate diluents, binders, lubricants, and disintegrators, as well as compound 1, or a pharmaceutically acceptable salt, solvate, or hydrate thereof. Typical diluents include, for example, various types of starch, lactose, mannitol, kaolin, calcium phosphate or sulfate, inorganic salts such as sodium chloride, and powdered sugar. Powdered cellulose derivatives are also useful. Typical tablet binders are substances such as starch, gelatin, and sugars such as lactose, fructose, glucose, and the like. Natural and synthetic gums are also convenient, including acacia, alginates, methylcellulose, polyvinylpyrrolidine, and the like. In some cases, polyethylene glycol, ethylcellulose, and waxes serve as binders.

In some cases, a lubricant in a tablet formulation helps prevent the tablet and punches from sticking in the die. In some cases, a lubricant is chosen from such solids as talc, magnesium and calcium stearate, stearic acid, and hydrogenated vegetable oils.

Tablet disintegrators are substances that swell when wetted to break up the tablet and release the compound. They include starches, clays, celluloses, aligns, and gums. More particularly, tablet disintegrators include corn and potato starches, methylcellulose, agar, bentonite, wood cellulose, powdered natural sponge, cation-exchange resins, alginic acid, guar gum, citrus pulp, carboxymethylcellulose, and sodium lauryl sulfate.

Enteric formulations are often used to protect an active ingredient from the strongly acidic contents of the stomach. Such formulations are created by coating a solid dosage form with a film of a polymer that is insoluble in acid environments, and soluble in basic environments. Exemplary films are cellulose acetate phthalate, polyvinyl acetate phthalate, hydroxypropyl methylcellulose phthalate, and hydroxypropyl methylcellulose acetate succinate.

Tablets are often coated with sugar as a flavor and sealant. Tablets can also be coated to provide a desired color.

In some embodiments, pharmaceutical compositions for use in any of the methods provided herein are described in the Examples.

Subjects

In some embodiments, the subject is immunocompromised. In some embodiments, the subject is an immunocompromised human subject. In some embodiments, the human subject is under the age of about 1 year. In some embodiments, the human subject is over the age of 1 year old. In some embodiments, the human subject is an infant under about 1 month old.

In some embodiments, the subject is infected with HIV/AIDS. In some embodiments, the subject is undergoing or has undergone cancer chemotherapy treatment. In some embodiments, the subject has acute myeloid leukemia or acute lymphoid leukemia. In some embodiments the subject has neutropenia, lymphopenia, graft-versus-host disease. In some embodiments, the subject is undergoing or has undergone corticosteroid treatment. In some embodiments, the subject is undergoing or has undergone TNF inhibitor treatment. In some embodiments, the subject is a transplant recipient. In some embodiments, the subject is a recipient of a hematopoietic stem-cell transplant, bone marrow transplant, lung transplant, liver transplant, heart transplant, kidney transplant, pancreas transplant or a combination thereof. In some embodiments, the subject is a recipient of a hematopoietic stem-cell transplant. In some embodiments, the subject is a recipient of a bone marrow transplant. In some embodiments, the subject is a recipient of a lung transplant. In some embodiments, the subject is a recipient of a liver transplant. In some embodiments, the subject is a recipient of a heart transplant. In some embodiments, the subject is a recipient of a kidney transplant. In some embodiments, the subject is a recipient of a pancreas transplant.

In some embodiments, the subject is immunocompromised.

In some embodiments, the subject is undergoing therapy with at least one immunosuppressant drug. In some embodiments, the immunosuppressant drug increases the risk of opportunistic infections in the subject.

Immunosuppressant agents/drugs that can weaken the immune system include, but are not limited to, corticosteroids, methotrexate, cyclosporine, tacrolimus, sirolimus, everolimus, pomalidomide, omalizumab, azathioprine, lenalidomide, thalidomide, anti-TNF inhibitors, interleukin inhibitors, Janus kinase inhibitors, Sphingosine-1-phosphate-receptor (S1P) agonists, S1P antagonists Calcineurin inhibitors, mTOR inhibitors, nucleotide synthesis inhibitors, biologics, and monoclonal antibodies.

Corticosteroids include, but are not limited to, prednisone, budesonide, prednisolone, methylprednisolone.

Janus kinase inhibitors include, but are not limited to, tofacitinib, baricitinib, filgotinib, and upadacitinib.

Sphingosine-1-phosphate-receptor antagonists include, but are not limited to, FTY720.

S1P agonists include, but are not limited to, ozanimod, etrasimod.

Calcineurin inhibitors include, but are not limited to, cyclosporine, and tacrolimus.

mTOR inhibitors include, but are not limited to, sirolimus, and everolimus.

Interleukin inhibitors include, without limitation, rilonacept, canakinumab, anakinra, reslizumab, brodalumab, ustekinumab, benralizumab, mepolizumab, tocilizumab, ixekizumab, dupilumab, secukinumab, tildrakizumab, guselkumab, sarilumab, basiliximab, risankizumab, siltuximab, daclizumab, and daclizumab.

Nucleotide synthesis inhibitors include, but are not limited to, azathioprine, leflunomide, mycophenolate.

Biologics include, but are not limited to, TNF alpha inhibitors, an integrin inhibitors, IL-12/23 inhibitors. Biologics include, but are not limited to, abatacept, adalimumab, anakinra, certolizumab, etanercept, golimumab, infliximab, ixekizumab, natalizumab, rituximab, secukinumab, tocilizumab, ustekinumab, etrolizumab, vedolizumab.

Monoclonal antibodies include, but are not limited to, basiliximab, daclizumab, alemtuzumab, rituximab, belatacept.

Methods of Dosing and Treatment Regimens

In one embodiment, compound 1, or a pharmaceutically acceptable salt, solvate, or hydrate thereof, is used in the preparation of medicaments for the treatment of diseases or conditions caused by fungal infections in a mammal. Methods for treating any of the diseases or conditions described herein in a mammal in need of such treatment, involves administration of pharmaceutical compositions that include compound 1, or a pharmaceutically acceptable salt, solvate, or hydrate thereof, or active metabolite of compound 1 (i.e., compound 1A), in therapeutically effective amounts to said mammal.

In certain embodiments, the compositions containing the compound(s) described herein are administered for prophylactic and/or therapeutic treatments. In certain therapeutic applications, the compositions are administered to a patient already suffering from a disease or condition, in an amount sufficient to cure or at least partially arrest at least one of the symptoms of the disease or condition. Amounts effective for this use depend on the severity and course of the disease or condition, previous therapy, the patient's health status, weight, and response to the drugs, and the judgment of the treating physician. Therapeutically effective amounts are optionally determined by methods including, but not limited to, a dose escalation and/or dose ranging clinical trial.

In prophylactic applications, compositions containing compound 1, or a pharmaceutically acceptable salt, solvate, or hydrate thereof, are administered to a patient susceptible to or otherwise at risk of a particular disease or condition. Such an amount is defined to be a "prophylactically effective amount or dose." In this use, the precise amounts also depend on the patient's state of health, weight, and the like. When used in patients, effective amounts for this use will depend on the underlying risk of developing a fungal infection, previous therapy, the patient's health status and response to the drugs, and the judgment of the treating physician. In one aspect, prophylactic treatments include administering to a mammal, who previously experienced at least one symptom of the disease being treated and is currently in remission, a pharmaceutical composition comprising compound 1, or a pharmaceutically acceptable salt, solvate, or hydrate thereof, in order to prevent a return of the symptoms of the disease or condition.

In certain embodiments wherein the patient's condition does not improve, upon the doctor's discretion the administration of compound 1, or a pharmaceutically acceptable salt, solvate, or hydrate thereof, is administered chronically, that is, for an extended period of time, including throughout the duration of the patient's life in order to ameliorate or otherwise control or limit the symptoms of the patient's disease or condition.

Once improvement of the patient's conditions has occurred, a maintenance dose is administered if necessary. Subsequently, in specific embodiments, the dosage or the frequency of administration, or both, is reduced, as a function of the symptoms, to a level at which the improved disease or condition is retained. In certain embodiments, however, the patient requires intermittent treatment on a long-term basis upon any recurrence of symptoms.

In one aspect, compound 1, or a pharmaceutically acceptable salt, solvate, or hydrate thereof, is administered daily to humans in need of therapy with compound 1, or a pharmaceutically acceptable salt, solvate, or hydrate thereof. In some embodiments, compound 1, or a pharmaceutically acceptable salt, solvate, or hydrate thereof, is administered once a day. In some embodiments, compound 1, or a pharmaceutically acceptable salt, solvate, or hydrate thereof, is administered twice a day.

In some embodiments, compound 1, or a pharmaceutically acceptable salt, solvate, or hydrate thereof, is administered twice daily, e.g., morning and evening.

In some embodiments, compound 1, or a pharmaceutically acceptable salt, solvate, or hydrate thereof, is administered for at least 2 weeks, at least 3 weeks, at least 4 weeks, at least 5 weeks, at least 6 weeks, at least 7 weeks, at least 8 weeks, at least 9 weeks, at least 10 weeks, at least 11 weeks, at least 12 weeks, at least 1 month, at least 2 months, at least 3 months, at least 4 months, or more.

In some embodiments, compound 1, or a pharmaceutically acceptable salt, solvate, or hydrate thereof, is administered to the human on a continuous dosing schedule. In some embodiments, compound 1, or a pharmaceutically acceptable salt, solvate, or hydrate thereof, is administered to the human on a continuous daily dosing schedule.

The term "continuous dosing schedule" refers to the administration of a particular therapeutic agent at regular intervals. In some embodiments, continuous dosing schedule refers to the administration of a particular therapeutic agent at regular intervals without any drug holidays from the particular therapeutic agent. In some other embodiments, continuous dosing schedule refers to the administration of a particular therapeutic agent in cycles. In some other embodiments, continuous dosing schedule refers to the administration of a particular therapeutic agent in cycles of drug administration followed by a drug holiday (for example, a wash out period or other such period of time when the drug is not administered) from the particular therapeutic agent. For example, in some embodiments the therapeutic agent is administered once a day, twice a day, daily for a week followed by a week of no administration of the therapeutic agent, daily for two weeks followed by one or two weeks of no administration of the therapeutic agent, daily for three weeks followed by one, two, or three weeks of no administration of the therapeutic agent, daily for four weeks followed by one, two, three, or four weeks of no administration of the therapeutic agent, weekly administration of the therapeutic agent followed by a week of no administration of the therapeutic agent, or biweekly administration of the therapeutic agent followed by two weeks of no administration of the therapeutic agent. In some embodiments, daily administration is once a day. In some embodiments, daily administration is twice a day.

The term "continuous daily dosing schedule" refers to the administration of a particular therapeutic agent everyday at roughly the same time each day. In some embodiments, daily administration is once a day. In some embodiments, daily administration is twice a day. In some embodiments, daily administration is three times a day. In some embodiments, daily administration is more than three times a day.

In some embodiments, the amount of compound 1, or a pharmaceutically acceptable salt, solvate, or hydrate thereof, is administered once a day. In some other embodiments, the amount of compound 1, or a pharmaceutically acceptable salt, solvate, or hydrate thereof, is administered twice a day.

In certain embodiments wherein improvement in the status of the disease or condition in the human is not observed, the daily dose of compound 1, or a pharmaceutically acceptable salt, solvate, or hydrate thereof, is increased. In some embodiments, a once a day dosing schedule is changed to a twice a day dosing schedule. In some embodiments, the frequency of administration is increased in order to provide maintained or more regular exposure to compound 1, or a pharmaceutically acceptable salt, solvate, or hydrate thereof. In some embodiments, the frequency of administration is increased in order to provide repeat high $C_{max}$ levels on a more regular basis and provide maintained or more regular exposure to compound 1, or a pharmaceutically acceptable salt, solvate, or hydrate thereof, such as a higher AUC level.

In any of the aforementioned aspects are further embodiments comprising single administrations of the effective amount of compound 1, or a pharmaceutically acceptable salt, solvate, or hydrate thereof, including further embodiments in which compound 1, or a pharmaceutically acceptable salt, solvate, or hydrate thereof, is administered (i) once a day; or (ii) multiple times over the span of one day.

In any of the aforementioned aspects are further embodiments comprising multiple administrations of the effective amount of compound 1, or a pharmaceutically acceptable salt, solvate, or hydrate thereof, including further embodiments in which (i) compound 1 is administered continuously or intermittently: as in a single dose; (ii) the time between multiple administrations is every 6 hours; (iii) compound 1 is administered to the mammal every 8 hours; (iv) compound 1 is administered to the mammal every 12 hours; (v) compound 1 is administered to the mammal every 24 hours. In further or alternative embodiments, the method comprises a drug holiday, wherein the administration of the compound is temporarily suspended or the dose of the compound being administered is temporarily reduced; at the end of the drug holiday, dosing of the compound is resumed. In one embodiment, the length of the drug holiday varies from 2 days to 1 year.

Generally, a suitable dose of compound 1, or a pharmaceutically acceptable salt, solvate, or hydrate thereof, for administration to a human will be in the range of about 500 mg/day to about 2000 mg/day; from about 600 mg/day to about 2000 mg/day; from about 800 mg/day to about 2000 mg/day; or from about 1000 mg/day to about 2000 mg/day.

In some embodiments, the administrations of the effective amount of compound 1, or a pharmaceutically acceptable salt, solvate, or hydrate thereof, comprises a treatment regimen that comprises the administration of a loading dose of compound 1, or a pharmaceutically acceptable salt, solvate, or hydrate thereof, followed by a maintenance dose of compound 1, or a pharmaceutically acceptable salt, solvate, or hydrate thereof. In some embodiments, the loading dose of compound 1, or a pharmaceutically acceptable salt, solvate, or hydrate thereof, is administered in a different manner than the maintenance dose of compound 1, or a pharmaceutically acceptable salt, solvate, or hydrate thereof In some embodiments, the loading dose of compound 1, or a pharmaceutically acceptable salt, solvate, or hydrate thereof, is administered in the same manner than the maintenance dose of compound 1, or a pharmaceutically acceptable salt, solvate, or hydrate thereof.

In some embodiments, the loading dose is administered as a solution by intravenous (IV.) infusion.

In some embodiments, the maintenance doses are administered orally in the form of solid dosage forms. In some embodiments, the solid dosage forms are tablets. In some embodiments, the maintenance doses are administered as a solution by intravenous (IV.) infusion.

In some embodiments, the loading dose comprises about 1500 mg to about 2500 mg of compound 1, or a pharmaceutically acceptable salt, solvate, or hydrate thereof In some embodiments, the loading dose comprises about 2000 mg of compound 1, or a pharmaceutically acceptable salt, solvate, or hydrate thereof. In some embodiments, the loading dose of compound 1, or a pharmaceutically acceptable salt, solvate, or hydrate thereof, comprises the administration of two doses of compound 1, or a pharmaceutically acceptable salt, solvate, or hydrate thereof, to the subject by intravenous (IV.) infusion. In some embodiments, each loading dose of compound 1, or a pharmaceutically acceptable salt, solvate, or hydrate thereof, is administered to the subject by intravenous (IV.) infusion over about 30 minutes to about 3 hours. In some embodiments, each loading dose of compound 1, or a pharmaceutically acceptable salt, solvate, or hydrate thereof, is administered to the subject by intravenous (IV.) infusion over about 30 minutes, over about 45 minutes, over about 1 hour, over about 1.5 hours, over about 2 hours, over about 2.5 hours, over about 3 hours, or over more than 3 hours. In some embodiments, each of the two doses of the loading dose comprises about 1000 mg of compound 1, or a pharmaceutically acceptable salt, solvate, or hydrate thereof.

In some embodiments, the loading dose comprises administration of about 1000 mg of compound 1, or a pharmaceutically acceptable salt, solvate, or hydrate thereof, to the subject by intravenous (IV.) infusion followed by a second administration of about 1000 mg of compound 1, or a pharmaceutically acceptable salt, solvate, or hydrate thereof, to the subject by intravenous (IV.) infusion within about 24 hours of the first infusion. In some embodiments, the second loading dose is administered within about 12 hours of the first loading dose, within about 13 hours of the first loading dose, within about 14 hours of the first loading dose, within about 15 hours of the first loading dose, within about 16 hours of the first loading dose, within about 17 hours of the first loading dose, within about 18 hours of the first loading dose, within about 19 hours of the first loading dose, within about 20 hours of the first loading dose, within about 21 hours of the first loading dose, within about 22 hours of the first loading dose, within about 23 hours of the first loading dose, or within about 24 hours of the first loading dose.

In some embodiments, the maintenance doses are initiated on the second day of treatment. In some embodiments, the maintenance is administered once daily starting on the second day of treatment.

In some embodiments, each maintenance dose comprises once daily administration of about 1000 mg to about 2000 mg of compound 1, or a pharmaceutically acceptable salt, solvate, or hydrate thereof. In some embodiments, each maintenance dose comprises once daily administration of about 600 mg to about 1000 mg of compound 1, or a pharmaceutically acceptable salt, solvate, or hydrate thereof. In some embodiments, each maintenance dose comprises once daily administration of about 600 mg of compound 1, or a pharmaceutically acceptable salt, solvate, or hydrate thereof. In some embodiments, each maintenance dose comprises once daily administration of about 650 mg of compound 1, or a pharmaceutically acceptable salt, solvate, or hydrate thereof. In some embodiments, each maintenance dose comprises once daily administration of about 700 mg of compound 1, or a pharmaceutically acceptable salt, solvate, or hydrate thereof. In some embodiments, each maintenance dose comprises once daily administration of about 750 mg of compound 1, or a pharmaceutically acceptable salt, solvate, or hydrate thereof In some embodiments, each maintenance dose comprises once daily administration of about 800 mg of compound 1, or a pharmaceutically acceptable salt, solvate, or hydrate thereof. In some embodiments, each maintenance dose comprises once daily administration of about 850 mg of compound 1, or a pharmaceutically acceptable salt, solvate, or hydrate thereof. In some embodiments, each maintenance dose comprises once daily administration of about 900 mg of compound 1, or a pharmaceutically acceptable salt, solvate, or hydrate thereof. In some embodiments, each maintenance dose comprises once daily administration of about 950 mg of compound 1, or a pharmaceutically acceptable salt, solvate, or hydrate thereof. In some embodiments, each maintenance dose comprises once daily administration of about 1000 mg of compound 1, or a pharmaceutically acceptable salt, solvate, or hydrate thereof. In some embodiments, each maintenance dose comprises once daily administration of about 1050 mg of compound 1, or a pharmaceutically acceptable salt, solvate, or hydrate thereof. In some embodiments, each maintenance dose comprises once daily administration of about 1100 mg of compound 1, or a pharmaceutically acceptable salt, solvate, or hydrate thereof. In some embodiments, each maintenance dose comprises once daily administration of about 1150 mg of compound 1, or a pharmaceutically acceptable salt, solvate, or hydrate thereof. In some embodiments, each maintenance dose comprises once daily administration of about 1200 mg of compound 1, or a pharmaceutically acceptable salt, solvate, or hydrate thereof. In some embodiments, each maintenance dose comprises once daily administration of more than about 1200 mg of compound 1, or a pharmaceutically acceptable salt, solvate, or hydrate thereof.

In some embodiments, each maintenance dose of compound 1, or a pharmaceutically acceptable salt, solvate, or hydrate thereof is administered over a period of about 30 minutes to about 3 hours by I.V. infusion starting on the second, third, or fourth day of treatment. In some embodiments, each maintenance dose of compound 1, or a pharmaceutically acceptable salt, solvate, or hydrate thereof is administered over a period of about 30 minutes, over about 45 minutes, over about 1 hour, over about 1.5 hours, over about 2 hours, over about 2.5 hours, over about 3 hours, or over more than 3 hours by I.V. infusion starting on the second, third, or fourth day of treatment.

In some embodiments, maintenance doses of about 600 mg to about 1500 mg compound 1, or a pharmaceutically acceptable salt, solvate, or hydrate thereof are administered over a period of about 30 minutes to about 5 hours by I.V. infusion starting on the second, third, or fourth day of treatment. In some embodiments, maintenance doses of about 600 mg, about 650 mg, about 700 mg, about 750 mg, about 800 mg, about 850 mg, about 900 mg, about 950 mg, about 1000 mg, about 1050 mg, about 1100 mg, about 1150 mg, or about 1200 mg compound 1, or a pharmaceutically acceptable salt, solvate, or hydrate thereof are administered over a period of about 30 minutes to about 5 hours by I.V. infusion starting on the second, third, or fourth day of treatment.

In some embodiments, maintenance doses of about 600 mg to about 900 mg compound 1, or a pharmaceutically acceptable salt, solvate, or hydrate thereof are administered over a period of about 30 minutes to about 3 hours by I.V. infusion starting on the second, third, or fourth day of treatment. In some embodiments, maintenance doses of about 600 mg, about 650 mg, about 700 mg, about 750 mg, about 800 mg, about 850 mg, or about 900 mg compound 1, or a pharmaceutically acceptable salt, solvate, or hydrate thereof are administered over a period of about 30 minutes to about 3 hours by I.V. infusion starting on the second, third, or fourth day of treatment.

In some embodiments, each maintenance dose comprises once daily administration of more than about 900 mg of compound 1, or a pharmaceutically acceptable salt, solvate, or hydrate thereof. In some embodiments, each maintenance dose comprises once daily administration of about 900 mg to about 2000 mg of compound 1, or a pharmaceutically acceptable salt, solvate, or hydrate thereof. In some embodiments, maintenance doses of about 900 mg to about 2000 mg compound 1, or a pharmaceutically acceptable salt, solvate, or hydrate thereof are administered over a period of about 30 minutes to about 3 hours by I.V. infusion starting on the second, third, or fourth day of treatment. In some embodiments, maintenance doses of about 900 mg to about 2000 mg compound 1, or a pharmaceutically acceptable salt, solvate, or hydrate thereof are administered over a period of more than 3 hours by I.V. infusion starting on the second, third, or fourth day of treatment.

In some embodiments, the maintenance dose of compound 1, or a pharmaceutically acceptable salt, solvate, or hydrate thereof is administered orally to the subject starting on the second, third, or fourth day of treatment.

In some embodiments, the maintenance dose of about 800 mg to about 1000 mg of compound 1, or a pharmaceutically acceptable salt, solvate, or hydrate thereof is administered orally once daily to the subject starting on the second, third, or fourth day of treatment. In some embodiments, the maintenance dose of about 800 mg of compound 1, or a pharmaceutically acceptable salt, solvate, or hydrate thereof is administered orally once daily to the subject starting on the second, third, or fourth day of treatment. In some embodiments, the maintenance dose of about 900 mg of compound 1, or a pharmaceutically acceptable salt, solvate, or hydrate thereof is administered orally once daily to the subject starting on the second, third, or fourth day of treatment. In some embodiments, the maintenance dose of about 1000 mg of compound 1, or a pharmaceutically acceptable salt, solvate, or hydrate thereof is administered orally once daily to the subject starting on the second, third, or fourth day of treatment.

In some embodiments, the maintenance dose of about 800 mg to about 1000 mg of compound 1, or a pharmaceutically acceptable salt, solvate, or hydrate thereof is administered orally once daily, or the daily dose is administered twice daily in evenly divided doses, to the subject starting on the second, third, or fourth day of treatment. In some embodiments, the maintenance dose of about 800 mg of compound 1, or a pharmaceutically acceptable salt, solvate, or hydrate thereof is administered orally once daily, or the daily dose is administered twice daily in evenly divided doses, to the subject starting on the second, third, or fourth day of treatment. In some embodiments, the maintenance dose of about 900 mg of compound 1, or a pharmaceutically acceptable salt, solvate, or hydrate thereof is administered orally once daily, or the daily dose is administered twice daily in evenly divided doses, to the subject starting on the second, third, or fourth day of treatment. In some embodiments, the maintenance dose of about 1000 mg of compound 1, or a pharmaceutically acceptable salt, solvate, or hydrate thereof is administered orally once daily, or the daily dose is administered twice daily in evenly divided doses, to the subject starting on the second, third, or fourth day of treatment.

In some embodiments, starting on the second, third, or fourth day of treatment: a) about 600 mg to about 900 mg of compound 1, or a pharmaceutically acceptable salt, solvate, or hydrate thereof is administered over a period of about 30 minutes to about 3 hours by I.V. infusion; orb) about 800 mg to about 1000mg of compound 1, or a pharmaceutically acceptable salt, solvate, or hydrate thereof is administered orally once daily.

In some embodiments, starting on the second day of treatment, about 600 mg to about 900 mg of compound 1, or a pharmaceutically acceptable salt, solvate, or hydrate thereof is administered over a period of about 30 minutes to about 3 hours by I.V. infusion; and starting on the fourth day of treatment: a) about 600 mg to about 900 mg of compound 1, or a pharmaceutically acceptable salt, solvate, or hydrate thereof is administered over a period of about 30 minutes to about 3 hours by I.V. infusion; orb) about 800 mg to about 1000mg of compound 1, or a pharmaceutically acceptable salt, solvate, or hydrate thereof is administered orally once daily.

In some embodiments, the daily dosage or the amount of active in the dosage form are lower or higher than the ranges indicated herein, based on a number of variables in regard to an individual treatment regime. In various embodiments, the daily and unit dosages are altered depending on a number of variables including, but not limited to, the disease or condition to be treated, the mode of administration, the requirements of the individual subject, the severity of the disease or condition being treated, the identity (e.g., weight) of the human, and the particular additional therapeutic agents that are administered (if applicable), and the judgment of the practitioner.

Toxicity and therapeutic efficacy of such therapeutic regimens are determined by standard pharmaceutical procedures in cell cultures or experimental animals, including, but not limited to, the determination of the $LD_{50}$ and the $ED_{50}$. The dose ratio between the toxic and therapeutic effects is the therapeutic index and it is expressed as the ratio between $LD_{50}$ and $ED_{50}$. In certain embodiments, the data obtained from cell culture assays and animal studies are used in formulating the therapeutically effective daily dosage range and/or the therapeutically effective unit dosage amount for use in mammals, including humans. In some embodiments, the daily dosage amount of compound 1 lies within a range of circulating concentrations that include the $ED_{50}$ with minimal toxicity. In certain embodiments, the daily dosage range and/or the unit dosage amount varies within this range depending upon the dosage form employed and the route of administration utilized.

In some embodiments, methods for treating fungal infections in a mammal with compound 1, or a pharmaceutically acceptable salt, solvate, or hydrate thereof, results in improvements of clinical symptoms attributed to the infection, improvements in radiologic abnormalities, and resolution of fungemia, if present. In some embodiments, clinical symptoms attributed to the infection include, for example, general appearance including appearance of the skin, head, eyes, ears, nose, throat, neck, trunk, or lymph nodes, or the respiratory, cardiovascular, gastrointestinal, genitourinary, musculoskeletal, neurological, psychological, lymphatic/hematological, and endocrine/metabolic systems of the mammal.

In some embodiments, improvements in one or more outcome measures are by at least or about 10%, 15%, 20%, 25%, 30%, 35%, 40%, 45%, 50%, 55%, 60%, 65%, 70%, 75%, 80%, 85%, 90%, 95%, or more than 95%. In some embodiments, the administration of compound 1, or a pharmaceutically acceptable salt, solvate, or hydrate thereof, to a mammal with a fungal infection or a mold infection results in one or more outcome measures improving by at least or about 0.5 fold, 1 fold, 1.5 fold, 2 fold, 2.5 fold, 3 fold, 3.5 fold, 4 fold, 5 fold, 6 fold, 7 fold, 8 fold, 9 fold, 10 fold, or more than 10 fold. Improvements, in some embodiments, are compared to a control. In some embodiments, a control is an individual who does not receive compound 1, or a pharmaceutically acceptable salt, solvate, or hydrate thereof In some embodiments, the control is an individual who does not receive a full dose of compound 1, or a pharmaceutically acceptable salt, solvate, or hydrate thereof In some embodiments, the control is baseline for the individual prior to receiving compound 1, or a pharmaceutically acceptable salt, solvate, or hydrate thereof.

In some embodiments, methods for treating a fungal infection or mold infection in a subject with compound 1, or a pharmaceutically acceptable salt, solvate, or hydrate thereof, results in improvements in one or more outcome measures. In some embodiments, a baseline assessment is determined, typically prior to the administration of compound 1, or a pharmaceutically acceptable salt, solvate, or hydrate thereof. Improvements in outcome measures are assessed with repeated assessments taken during treatment with compound 1 and a comparison against the baseline assessment and/or any prior assessment(s).

Evaluating patients for fungal infections and assessing efficacy of treatment with compound 1, or a pharmaceutically acceptable salt, solvate, or hydrate thereof, includes multiple modalities of diagnostic testing, including: radiological assessments including CT scanning of the chest, sinuses, and abdomen; fungal culture and microscopy of respiratory specimens; blood, serum, or bronchoalveolar fluid fungal antigen testing; blood, serum, or bronchoalveolar fluid pathogenic DNA testing; biopsy of the lung (open, percutaneous or transbronchial); the aspergillosis urine test; and other molecular testing of respiratory samples.

In some embodiments, methods for treating fungal infections in a mammal with compound 1, or a pharmaceutically acceptable salt, solvate, or hydrate thereof, result in improvements that are measured with a radiological assessment such as a computed tomography (CT) scan. In some embodiments, imaging methods that detect inflammation are used, such as positron emission tomography or indium-labeled white blood cell scintigraphy. In some embodiments, the radiological assessment is used to determine if a fungal infection is present, such as Allergic Bronchopulmonary Aspergillosis (ABPA) or aspergilloma or fungal ball. In some embodiments, CT scan hallmarks of aspergillosis include: halo sign, indicating pulmonary hemorrhage; air crescent sign, indicating cavitations; and hypodense sign, as a precursor to the air crescent sign and appears as relative hypodensity within the nodular lesion(s) (see A. Prasad, et al. *J Clin Diagn Res.* 2016 Apr; 10(4): TE01-TE05). In some embodiments, the radiological assessment is used to determine the size or extent of the infection. In some embodiments, CT scans are preformed every 7 days or 14 days while the mammal is undergoing treatment with compound 1, or a pharmaceutically acceptable salt, solvate, or hydrate thereof. In some embodiments, total infection load decreases by at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, or at least 95% following a treatment regimen with compound 1, or a pharmaceutically acceptable salt, solvate, or hydrate thereof.

In some embodiments, methods for treating fungal infections in a mammal with compound 1, or a pharmaceutically acceptable salt, solvate, or hydrate thereof, result in improvements that are measured with a fungal culture of a bodily fluid, such as bronchoalveolar fluid, sputum, bronchial brush, or sinus aspirate. In some embodiments, fungal load as determined in a fungal culture decreases by at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, or at least 95% following a treatment regimen with compound 1, or a pharmaceutically acceptable salt, solvate, or hydrate thereof.

In some embodiments, methods for treating fungal infections in a mammal with compound 1, or a pharmaceutically acceptable salt, solvate, or hydrate thereof, result in improvements that are measured with a test for detecting a fungal antigen, such as 1,3-β-D-glucan or galactomannan, in a bodily fluid, such as blood, serum, or bronchoalveolar fluid. The measurement galactomannan, 1,3-β-D-glucan has been widely used as a biomarker for early diagnosis of invasive pulmonary aspergillosis (IPA) in neutropenic patients, together with polymerase chain reaction (PCR) assay.

1,3-β-D-glucan is an abundant cell wall polysaccharide and is found in most fungi such as, for example, *Aspergillus* spp. (E. S. Theel, et al., *J Clin Microbial.* 2013 November; 51(11): 3478-3483 In some embodiments, methods for treating fungal infections in a mammal with compound 1, or a pharmaceutically acceptable salt, solvate, or hydrate thereof, result in improvements that are measured with a suitable 1,3-β-D-glucan test. In some embodiments, 1,3-β-D-glucan levels are measured in serum samples from the mammal. In some embodiments, 1,3-β-D-glucan levels are determined using a known 1,3-β-D-glucan detection assay, such as those from Fungitell (Associates of Cape Code, Inc., East Falmouth, Mass., USA), Wako (Wako Pure Chemical Industries, Ltd., Tokyo, Japan), Fungitec-G (Seikagaku, Kogyo, Tokyo, Japan), and Maruha (Maruha-Nichiro, Foods Inc., Tokyo, Japan). In some embodiments, 1,3-β-D-glucan levels decrease by at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, or at least 95% following a treatment regimen with compound 1, or a pharmaceutically acceptable salt, solvate, or hydrate thereof. In some embodiments, consistently decreasing 1,3-β-D-glucan levels during treatment result in a favorable therapeutic response among patients with proven or probable invasive fungal infections.

Galactomannan is a polysaccharide antigen that exists primarily in the cell walls of *Aspergillus* spp. (M. Hites, et al., *Ann Transl Med.* 2016 Sep; 4(18): 353). Galactomannan may be released into the blood and other body fluids even in the early stages of *Aspergillus* invasion, and the presence of this antigen can be sustained for 1 to 8 weeks. In some embodiments, methods for treating fungal infections in a mammal with compound 1, or a pharmaceutically acceptable salt, solvate, or hydrate thereof, result in improvements that are measured with a suitable galactomannan test. In some embodiments, galactomannan levels are measured in serum samples from the mammal. In some embodiments, galactomannan levels are measured in bronchoalveolar lavage fluid samples from the mammal. In some embodiments, galactomannan levels are determined using a known galactomannan detection assay. In some embodiments, galactomannan levels are determined using a galactomannan enzyme-linked immunosorbent assay (ELISA). In some embodiments, galactomannan levels decrease by at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, or at least 95% following a treatment regimen with compound 1, or a pharmaceutically acceptable salt, solvate, or hydrate thereof. In some embodiments, consistently decreasing galactomannan levels during treatment result in a favorable therapeutic response among patients with proven or probable invasive fungal infections. In some embodiments, sensitivity of the galactomannan assay is higher in neutropenic patients than in non-neutropenic patients, as galactomannan molecules are, in some instances, cleared by neutrophils.

In some embodiments, methods for treating fungal infections in a mammal with compound 1, or a pharmaceutically acceptable salt, solvate, or hydrate thereof, result in improvements that are measured with a suitable pathogen DNA test. In some embodiments, pathogen DNA levels are measured in blood samples from the mammal. In some embodiments, pathogen DNA levels are measured in serum samples from the mammal. In some embodiments, pathogen DNA levels are measured in bronchoalveolar lavage fluid samples from the mammal. In some embodiments, pathogen DNA levels are determined using a known pathogen DNA detection assay. In some embodiments, pathogen DNA levels are determined using next-generation sequencing and/or polymerase chain reaction (PCR) analysis. In some embodiments, pathogen DNA levels decrease by at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, or at least 95% following a treatment regimen with compound 1, or a pharmaceutically acceptable salt, solvate, or hydrate thereof.

In some embodiments, methods for treating fungal infections in a subject with compound 1, or a pharmaceutically acceptable salt, solvate, or hydrate thereof, results in histological improvements in biopsied tissue samples taken from a subject with a fungal infection or mold infection. In some embodiments, the biopsied tissue is lunge tissue.

In some embodiments, methods for treating aspergillosis in a mammal with compound 1, or a pharmaceutically acceptable salt, solvate, or hydrate thereof, result in improvements that are measured with the Aspergillosis urine test (K A Marr, et al., *Clinical Infectious Diseases,* Volume 67, Issue 11, 1 December 2018, Pages 1705-1711). Briefly, the aspergillosis urine test detects the presence of fungal antigens in urine. The antigens are galactofuranose-containing and are detected with an antibody that is specific for such antigens. In some embodiments, levels of these antigens decrease by at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, or at least 95% following a treatment regimen with compound 1, or a pharmaceutically acceptable salt, solvate, or hydrate thereof.

In some embodiments, methods for treating fungal infections in a mammal with compound 1, or a pharmaceutically acceptable salt, solvate, or hydrate thereof, increases the overall survival rate of the subject by at least 10%, at least 20%, at least 30%, at least 40%, at least 50%, at least 60%, at least 70%, at least 80%, at least 90%, at least 95%, or 100%. In some embodiments, the overall survival rate is measured after 42 days. In some embodiments, the overall survival rate is measured after 84 days.

In some embodiments, methods for treating fungal infections in a mammal with compound 1, or a pharmaceutically acceptable salt, solvate, or hydrate thereof, decreases the all-cause mortality rate of the subject by at least 10%, at least 20%, at least 30%, at least 40%, at least 50%, at least 60%, at least 70%, at least 80%, at least 90%, at least 95%, or 100%. In some embodiments, the all-cause mortality rate is measured after 42 days. In some embodiments, the all-cause mortality rate is measured after 84 days.

Combination Treatments

In certain instances, it is appropriate to administer compound 1, or a pharmaceutically acceptable salt, solvate, or hydrate thereof, in combination with one or more other therapeutic agents.

In one embodiment, the therapeutic effectiveness of compound 1, or a pharmaceutically acceptable salt, is enhanced by administration of an adjuvant (i.e., by itself the adjuvant has minimal therapeutic benefit, but in combination with another therapeutic agent, the overall therapeutic benefit to the patient is enhanced). Or, in some embodiments, the benefit experienced by a patient is increased by administering compound 1, or a pharmaceutically acceptable salt, solvate, or hydrate thereof, with another agent (which also includes a therapeutic regimen) that also has therapeutic benefit.

In one specific embodiment, compound 1, or a pharmaceutically acceptable salt, solvate, or hydrate thereof, is co-administered with a second therapeutic agent, wherein compound 1, or a pharmaceutically acceptable salt, and the second therapeutic agent modulate different aspects of the disease or condition being treated, thereby providing a greater overall benefit than administration of either therapeutic agent alone.

In any case, regardless of the disease or condition being treated, the overall benefit experienced by the patient is simply additive of the two therapeutic agents or the patient experiences a synergistic benefit.

In certain embodiments, different therapeutically-effective dosages of compound 1, or a pharmaceutically acceptable salt, solvate, or hydrate thereof, will be utilized in formulating pharmaceutical composition and/or in treatment regimens when compound 1, or a pharmaceutically acceptable salt, solvate, or hydrate thereof, is administered in combination with one or more additional agent, such as an additional therapeutically effective drug, an adjuvant or the like. Therapeutically effective dosages of drugs and other agents for use in combination treatment regimens is optionally determined by means similar to those set forth hereinabove for the actives themselves. Furthermore, the methods of prevention/treatment described herein encompasses the use of metronomic dosing, i.e., providing more frequent, lower doses in order to minimize toxic side effects. In some embodiments, a combination treatment regimen encompasses treatment regimens in which administration of compound 1, or a pharmaceutically acceptable salt or solvate thereof, is initiated prior to, during, or after treatment with a second agent described herein, and continues until any time during treatment with the second agent or after termination of treatment with the second agent. It also includes treatments in which compound 1, or a pharmaceutically acceptable salt, solvate, or hydrate thereof, and the second agent being used in combination are administered simultaneously or at different times and/or at decreasing or increasing intervals during the treatment period. Combination treatment further includes periodic treatments that start and stop at various times to assist with the clinical management of the patient.

It is understood that the dosage regimen to treat, prevent, or ameliorate the condition(s) for which relief is sought, is modified in accordance with a variety of factors (e.g., the disease or condition from which the subject suffers; the age, weight, sex, diet, and medical condition of the subject). Thus, in some instances, the dosage regimen actually employed varies and, in some embodiments, deviates from the dosage regimens set forth herein.

For combination therapies described herein, dosages of the co-administered compounds vary depending on the type of co-drug employed, on the specific drug employed, on the disease or condition being treated and so forth. In additional embodiments, when co-administered with one or more other therapeutic agents, compound 1, or a pharmaceutically acceptable salt or solvate thereof, is administered either simultaneously with the one or more other therapeutic agents, or sequentially.

In combination therapies, the multiple therapeutic agents (one of which is compound 1, or a pharmaceutically acceptable salt, solvate, or hydrate thereof) are administered in any order or even simultaneously. If administration is simultaneous, the multiple therapeutic agents are, by way of example only, provided in a single, unified form, or in multiple forms (e.g., as a single pill or as two separate pills; or as a single IV infusion solution or as two separate IV infusion solutions).

Compound 1, or a pharmaceutically acceptable salt, solvate, or hydrate thereof, as well as combination therapies, are administered before, during or after the occurrence of a disease or condition, and the timing of administering the composition containing compound 1, or a pharmaceutically acceptable salt, solvate, or hydrate thereof, varies. Thus, in one embodiment, compound 1 or a pharmaceutically acceptable salt, solvate, or hydrate thereof, is used as a prophylactic and are administered continuously to subjects with a propensity to develop conditions or diseases in order to prevent the occurrence of the disease or condition. In another embodiment, compound 1, or a pharmaceutically acceptable salt, solvate, or hydrate thereof, is administered to a subject during or as soon as possible after the onset of the symptoms. In specific embodiments, compound 1, or a pharmaceutically acceptable salt or solvate thereof, is administered as soon as is practicable after the onset of a disease or condition is detected or suspected, and for a length of time necessary for the treatment of the disease. In some embodiments, the length required for treatment varies, and the treatment length is adjusted to suit the specific needs of each subject. For example, in specific embodiments, compound 1, or a pharmaceutically acceptable salt or solvate thereof, or a formulation containing compound 1, or a pharmaceutically acceptable salt or solvate thereof, is administered for at least 4 weeks, at least 6 weeks, at least 8 weeks, at least 10 weeks, at least 12 weeks, or more than 12 weeks.

Exemplary Agents for use in Combination Therapy

In some embodiments, compound 1, or a pharmaceutically acceptable salt, solvate, or hydrate thereof, is administered in combination with one or more additional therapies used for treating fungal and/or mold infections in a mammal.

In certain embodiments, the at least one additional therapy is administered at the same time as compound 1, or a pharmaceutically acceptable salt, solvate, or hydrate thereof. In certain embodiments, the at least one additional therapy is administered less frequently than compound 1, or a pharmaceutically acceptable salt, solvate, or hydrate thereof. In certain embodiments, the at least one additional therapy is administered more frequently than compound 1, or a pharmaceutically acceptable salt, solvate, or hydrate thereof. In certain embodiments, the at least one additional therapy is administered prior to administration of compound 1, or a pharmaceutically acceptable salt, solvate, or hydrate thereof. In certain embodiments, the at least one additional therapy is administered after administration of compound 1, or a pharmaceutically acceptable salt, solvate, or hydrate thereof.

In some embodiments, the at least one additional therapy is an antifungal agent. In some embodiments, the second therapeutic agent is an antifungal agent selected from the group consisting of: a polyene antifungal agent, an azole antifungal agent, an allylamine antifungal agent, and an echinocandin antifungal agent.

In some embodiments, the polyene antifungal agent is amphotericin B, candicidin, filipin, hamycin, natamycin, nystatin, or rimocidin.

In some embodiments, the azole antifungal agent is an imidazole, a triazole, or a thiazole. In some embodiments, the imidazole is bifonazole, butoconazole, clotrimazole, econazole, fenticonazole, ketoconazole, luliconazole, miconazole, omoconazole, oxiconazole, sertaconazole, sulconazole, or tioconazole. In some embodiments, the triazole is albaconazole, efinaconazole, epoxiconazole, fluconazole, isavuconazole, itraconazole, posaconazole, propiconazole, ravuconazole, terconazole, or voriconazole. In some embodiments, the thiazole is abafungin.

In some embodiments, the allylamine antifungal agent is amorolfin, butenafine, naftifine, or terbinafine.

In some embodiments, the echinocandin antifungal agent is selected from the group consisting of: anidulafungin, caspofungin, micafungin and rezafungin.

Adjunctive Therapies

In addition to antifungal treatment, the optimal management of patients with fungal infections includes surgical debulking of infected tissues and removal of venous catheters in the occasional patient with confirmed catheter-related fungal infections. In some embodiments, treatment with compound 1, or a pharmaceutically acceptable salt, solvate, or hydrate thereof, comprises G-CSF or GM-CSF, G-CSF-stimulated granulocyte transfusions. In some embodiments, treatment with compound 1, or a pharmaceutically acceptable salt, solvate, or hydrate thereof, comprises gamma interferon.

Kits and Articles of Manufacture

Described herein are kits for treating treatment of a fungal infection in a subject comprising administering to said subject compound 1, or a pharmaceutically acceptable salt, solvate, or hydrate thereof.

For use in the therapeutic applications described herein, kits and articles of manufacture are also described herein. In some embodiments, such kits include a carrier, package, or container that is compartmentalized to receive one or more containers such as vials, tubes, and the like, each of the container(s) including one of the separate elements to be used in a method described herein. Suitable containers include, for example, bottles, vials, syringes, and test tubes. In some embodiments, the containers are formed from a variety of materials such as glass or plastic.

The articles of manufacture provided herein contain packaging materials. Examples of pharmaceutical packaging materials include, but are not limited to, blister packs, bottles, tubes, inhalers, pumps, bags, vials, containers, syringes, bottles, and any packaging material suitable for a selected formulation and intended mode of administration and treatment. A wide array of formulations of the compounds and compositions provided herein are contemplated as are a variety of treatment regimens that would benefit from the administration of compound 1, or a pharmaceutically acceptable salt, solvate, or hydrate thereof.

The container(s) optionally have a sterile access port (for example the container is an intravenous solution bag or a vial having a stopper pierceable by a hypodermic injection needle). Such kits optionally comprise a compound with an identifying description or label or instructions relating to its use in the methods described herein.

A kit will typically include one or more additional containers, each with one or more of various materials (such as reagents, optionally in concentrated form, and/or devices) desirable from a commercial and user standpoint for use of a compound described herein. Non-limiting examples of such materials include, but not limited to, buffers, diluents, filters, needles, syringes; carrier, package, container, vial and/or tube labels listing contents and/or instructions for use, and package inserts with instructions for use. A set of instructions will also typically be included.

In some embodiments, a label is on or associated with the container. A label, in some cases, is on a container when letters, numbers or other characters forming the label are attached, molded or etched into the container itself; a label, in some cases, is associated with a container when it is present within a receptacle or carrier that also holds the container, e.g., as a package insert. A label, in some cases, is used to indicate that the contents are to be used for a specific therapeutic application. The label, in some cases, indicates directions for use of the contents, such as in the methods described herein.

In certain embodiments, a pharmaceutical composition comprising compound 1, or a pharmaceutically acceptable salt, solvate, or hydrate thereof, is presented in a pack or dispenser device which, in some cases, contains one or more unit dosage forms. The pack, in some cases, for example contains metal or plastic foil, such as a blister pack. The pack or dispenser device, in some cases, is accompanied by instructions for administration. The pack or dispenser, in some cases, is also accompanied with a notice associated with the container in form prescribed by a governmental agency regulating the manufacture, use, or sale of pharmaceuticals, which notice is reflective of approval by the agency of the form of the drug for human or veterinary administration. Such notice, for example, in some cases, is the labeling approved by the U.S. Food and Drug Administration for prescription drugs, or the approved product insert. Compositions containing a compound provided herein formulated in a compatible pharmaceutical carrier, in some cases, is also prepared, placed in an appropriate container, and labeled for treatment of an indicated condition.

EXAMPLES

The following examples are provided for illustrative purposes only and not to limit the scope of the claims provided herein.

Example 1: Compound 1 Injection

Compound 1 Injection is prepared as a sterile solution that is further diluted into 0.9% sodium chloride injection prior to administration. Compound 1 Injection is a solution formulated at a concentration of 20 mg/mL. The formulation consists of compound 1 drug substance, sodium chloride, potassium phosphate (dibasic and monobasic), hydrochloric acid, sodium hydroxide, and Water for Injection (WFI).

A 50-mL sterile glass vial is filled with 35 mL of Compound 1 Injection yielding 700 mg/vial. Compound 1 Injection is further diluted and administered as an IV infusion as specified in the clinical protocol. During the preparation of the admixture solution containing compound 1, Compound 1 Injection is filtered with a 0.2 μm filter prior to infusion to remove any inherent particles.

Table 1 describes the composition of Compound 1 Injection, 20 mg/mL, for a 35 mL fill in a 50 mL vial.

TABLE 1

| Component | Approximate Concentration | Content Per Unit |
|---|---|---|
| Compound 1 | 20 mg/mL | 700 mg |
| Sodium Chloride | 6.1 mg/mL | 213.5 mg |
| Potassium Phosphate, Monobasic | 0.16 mg/mL | 5.6 mg |
| Potassium Phosphate, Dibasic | 3.27 mg/mL | 114.5 mg |
| Sodium Hydroxide | As needed | As needed |
| Hydrochloric Acid | As needed | As needed |
| Water for Injection | N/A | Q.S. 35 mL |

N/A = not applicable;
QS = quantity sufficient for

To make the Compound 1 Injection Formulation: 1. Add sodium chloride, potassium phosphate (monobasic and dibasic) into a vessel containing water for injection; 2. Adjust pH to 8.0 using 1M hydrochloric acid solutions and/or 1M sodium hydroxide solutions; 3. Slowly add compound 1 drug substance to the solution and stir/mix at 15° C. to 30° C.; 4. Adjust pH to 8.0 using hydrochloric acid solutions and/or sodium hydroxide solutions to dissolve; 5. Q.S. with water for injection and continue to stir at 15° C. to 30° C.; 6. Aseptically filter through 2×0.2 μm membrane filters into sterile 50 mL vials with a 35 mL fill volume closed with a chlorobutyl stopper. (Note: At the completion of each manufactured batch, the filter integrity is tested using a bubble point test and result is documented in the batch record); and 7. The vials are inspected prior to packaging and labeling.

Example 2: Compound 1 Tablets

Compound 1 Tablets are formulated at strengths of 100 mg and 200 mg coated white tablets. Table 2 and Table 3 list the content of the Compound 1 Tablets at 100 mg and 200 mg strength, respectively.

TABLE 2

| Component | Amount per Tablet (% wt) | Function |
|---|---|---|
| Compound 1 | 100 mg (25.0%) | Active Ingredient |
| Avicel DG[3] | 231 mg (57.75%[1]) | Diluent |
| Pregelatinized Starch | 40 mg (5.0%[1], 5%[2]) | Disintegrant |
| Colloidal silicon dioxide (Cab-o-sil M5P) | 3 mg (0.75%[2]) | Glidant |
| Povidone | 12 mg (3.0%[1]) | Disintegrant |
| Talc | 8 mg (2.0%[1]) | Glidant |
| Magnesium Stearate (HyQual) Vegetable Source | 6 mg (0.5%[1], 1.00%[2]) | Lubricant |
| Core Weight (mg) | 400 mg | |
| Opadry II AMB, coating white[4] | 20 mg (5.0%) | Film Coating |
| Purified Water | Not applicable | Solvent |
| Coated Tablet Weight (mg) | 420 mg | |

[1]intragranular.
[2]extragranular.
[3]Avicel DG is comprised or 75% of microcrystalline cellulose and 25% anhydrous dibasic calcium phosphate.
[4]The film coating Opadry II AMB is manufactured by ColorCon and composed of polyvinyl alcohol, talc, titanium dioxide, glyceryl monocaprylocaprate, and sodium lauryl sulfate.

TABLE 3

| Component | Amount per Tablet (% wt) | Function |
|---|---|---|
| Compound 1 | 200 mg (25.0%) | Active Ingredient |
| Avicel DG[3] | 462 mg (57.75%[1]) | Diluent |
| Pregelatinized Starch | 80 mg (5.0%[1], 5%[2]) | Disintegrant |
| Colloidal silicon dioxide (Cab-o-sil M5P) | 6 mg (0.75%[2]) | Glidant |
| Povidone | 24 mg (3.0%[1]) | Disintegrant |
| Talc | 16 mg (2.0%[1]) | Glidant |
| Magnesium Stearate (HyQual) Vegetable Source | 12 mg (0.5%[1], 1.00%[2]) | Lubricant |
| Core Weight (mg) | 800 mg | |
| Opadry II AMB, coating white[4] | 40 mg (5.0%) | Film Coating |
| Purified Water | Not applicable | Solvent |
| Coated Tablet Weight (mg) | 840 mg | |

[1]intragranular.
[2]extragranular.
[3]Avicel DG is comprised or 75% of microcrystalline cellulose and 25% anhydrous dibasic calcium phosphate.
[4]The film coating Opadry II AMB is manufactured by ColorCon and composed of polyvinyl alcohol, talc, titanium dioxide, glyceryl monocaprylocaprate, and sodium lauryl sulfate.

Example 3: A Phase 2, Open-Label Study to Evaluate the Safety and Efficacy of Compound 1 in the Treatment of Patients with Invasive Mold Infections Caused by *Aspergillus* Species or Rare Molds Indication: Treatment of patients with invasive mold infections (IMIs) caused by *Aspergillus* species (spp.) or rare molds Objectives: The primary objective of this study is to evaluate the safety and efficacy of compound 1 for the treatment of adult patients aged 18 years and above with infectious mold infections caused by *Aspergillus* spp. or rare molds (e.g., *Scedosporium* spp., *Fusarium* spp., and Mucorales fungi), who have limited antifungal treatment options.

The secondary objectives of this study are to: evaluate global response at End of Study Treatment (EOST); evaluate safety parameters of compound 1; evaluate pharmacokinetic (PK) parameters of compound 1.

Population: This study will enroll male and female patients aged 18 years and above with a confirmed diagnosis of invasive aspergillosis or invasive rare mold infection. Patients will have limited or no treatment options due to documented/anticipated resistance, contraindication, intolerance, or lack of clinical response to standard of care (SOC) antifungal therapy, as advocated by the relevant regional/country treatment guidelines.

Inclusion Criteria

Patients must meet all of the following criteria to be eligible for study entry:

1. Males or females, 18 years or older.
2. Patients with proven or probable Infectious Mold Infection (IMI) caused by *Aspergillus* spp.

Patients who present with IMI due to other filamentous fungi (e.g., *Scedosporium* spp., *Fusarium* spp., and Mucorales fungi such as *Mucor* spp. or *Rhizopus* spp.) may also be enrolled. A proven or probable IMI will be defined in accordance with a modified version of the 2008 Revised Definitions of Invasive Fungal Disease from the European Organization for Research and Treatment of Cancer/Mycosis Study Group (EORTC/MSG) Consensus Group criteria.
3. Have limited or no treatment options due to documented or anticipated resistance, contraindication, intolerance, or lack of clinical response to SOC antifungal therapy, as advocated by the relevant regional/country treatment guidelines.
4. Patients where the Investigator considers that there is a potential advantage of using compound 1 over current SOC (e.g., broad spectrum of activity, activity against resistant mold pathogens, IV and PO formulations, favorable DDI profile, favorable hepatic and renal safety profile, wide tissue distribution including brain), and/or where the SOC antifungal therapy carries significant risk of toxicity or treatment failure (e.g., emergence of IMI during antifungal prophylaxis, DDI risk, safety/toxicity risk, site of infection not accessible by SOC).
5. Female patients of nonchildbearing potential must be 1 of the following:
   a. Surgically sterile (hysterectomy, bilateral tubal ligation, bilateral salpingectomy, and/or bilateral oophorectomy).
   b. Postmenopausal (amenorrhea for >12 months without an alternative medical cause).
6. Females of childbearing potential (i.e., not postmenopausal or surgically sterilized) must have a negative urine or serum pregnancy test result within 96 hours prior to Baseline (i.e., predose on Day 1). Participating females of childbearing potential with male partners, and males with female partner(s) of childbearing potential, must agree to use 2 forms of contraception, 1 of which must be highly effective and the other an acceptable barrier method (male or female condom), throughout the duration of the study and for 90 days following the last study drug administration. Highly effective methods of contraception include the following:
   a. Combined (estrogen and progestogen containing) hormonal contraception associated with inhibition of ovulation (PO, intravaginal, or transdermal), progestogen-only hormonal contraception associated with inhibition of ovulation (PO, injectable, or implantable), intrauterine device, or intrauterine hormone-releasing system.
   b. Bilateral tubal occlusion or vasectomized partner.
   c. Sexual abstinence.
7. Male patients must agree to abstain from sperm donation and use condoms with spermicide during sexual intercourse between Screening and at least 90 days after administration of the last dose of study drug. Male patients must ensure nonpregnant female partner(s) of childbearing potential comply with the contraception requirements in Inclusion Criterion 6.
8. Patients must be willing to participate in the study, to give written informed consent, and to comply with the study restrictions; where permitted by local regulations, written informed consent from a legal authorized representative will be obtained for patients who are unable to give consent.

Exclusion Criteria

Patients who meet any of the following criteria will not be eligible for the study:

1. Refractory hematologic malignancy.
2. Chronic aspergillosis, aspergilloma, or allergic bronchopulmonary aspergillosis.
3. Treatment with systemic (PO, IV, or inhaled) mold active antifungal therapy for ≥120 hours immediately before initial dosing.

Note: An exception is antifungal prophylaxis, which is allowed but must be stopped upon commencement of treatment with compound 1.

Additionally, patients with invasive fungal infection caused by a mold with documented resistance to or lack of coverage by the prior SOC in question, may have received >120 hours prior treatment and remain eligible for the study. These patients must be discussed with the Medical Monitor prior to enrollment, and prior treatment in this case should not exceed >168 hours.
4. Evidence of significant hepatic dysfunction, defined as any of the following:
   a. Total bilirubin ≥3× the upper limit of normal (ULN) unless isolated hyperbilirubinemia or due to documented Gilbert's disease.
   b. Alanine transaminase or aspartate transaminase ≥5× ULN.
   c. Severe or moderate hepatic impairment (Child-Pugh Score >6 points) at any time during 2 weeks prior to dosing.
5. Ongoing medical history of neurological disorders including abnormal movements or seizures.
6. Patient receiving palliative care only.
7. Known hypersensitivity or other serious reaction to compound 1 or any ingredient of compound 1.
8. Patient is lactating and/or pregnant or intending to be pregnant during the duration of the study.
9. Investigational drug administered within 30 days or 5 terminal half-lives prior to study drug dosing (whichever is longer).

Note: Participation in research protocols for approved agents for the treatment of an underlying condition is permitted.
10. Prior participation in this study or any previous study of compound 1.
11. Concomitant use of medication that is a strong inducer (i.e., rifampin, carbamazepine, phenytoin, rifabutin, efavirenz, nevirapine, phenobarbital, modafinil, St. John's Wort, enzalutamide) of CYP enzymes.
12. Any other condition or laboratory abnormality that, in the opinion of the Investigator or the Sponsor, would put the patient at unacceptable risk for participation in the study or may interfere with the assessments included in the study.

Study Design and Duration:

This is a Phase 2, multicenter, open-label, non-comparative study to evaluate the safety and efficacy of compound 1 for the treatment of IMIs caused by *Aspergillus* spp. or rare molds (e.g., *Scedosporium* spp., *Fusarium* spp., and Mucorales fungi). Patients 18 years of age or older will undergo Screening procedures for up to 5 days, following which eligible patients will participate in the study drug Treatment Period for up to 6 weeks, with a Follow-Up Visit 4 weeks after EOST, and a Follow-Up Phone Call 12 weeks after Day 1 (Day 84). The total duration of a patient's participation in the study will be approximately 12 weeks, inclusive of the follow-up telephone call required on Day 84. Patients who require treatment for longer than 6 weeks can be switched to other licensed antifungal therapy (OLAT) at the discretion of the Investigator and in consultation with the Medical Monitor if the situation allows.

This study will consist of a single treatment arm consisting of a loading dose of 1000 mg compound 1, administered over 3 hours by IV infusion twice daily (BID) within the first 24 hours after initiation of the first infusion. On Days 2 and 3, 600 mg compound 1 will be administered over 3 hours by IV infusion once daily (QD). From Day 4 through EOST, the IV dose remains 600 mg compound 1 administered over 3 hours by IV infusion QD, or patients may be switched to PO administration of 800 mg compound 1 QD. The decision to switch from IV to PO compound 1 will be based on the Investigator's discretion and can be done on any day from Day 4 onwards. Patients may be switched back to the IV treatment as needed if unable to tolerate PO medication. Oral compound 1 may be given as an outpatient.

Administration of compound 1 should continue for at least 4 weeks but no longer than 6 weeks (inclusive of the loading dose [Day 1]). After 4 weeks, if an Investigator documents an improvement or resolution in clinical signs and symptoms, e.g., if follow-up imaging (as applicable) shows improvement; or a mycological response (if amenable to repeat sampling) is observed, the Investigator may choose to discontinue dosing.

Dosage Forms and Route of Administration:

On Study Day 1 (or over the first 24 hours if dosing starts in the evening), a 1000 mg compound 1 loading dose will be administered over 3 hours by IV infusion BID.

On Study Days 2 and 3, a 600 mg compound 1 maintenance dose will be administered over 3 hours by IV infusion QD.

On Study Day 4 through EOST, a compound 1 maintenance dose will be administered as either:
  600 mg compound 1 IV infusion QD over 3 hours, or
  800 mg PO QD Criteria for Switching from Intravenous to Oral Dose:

Patients who have completed a minimum of 3 days of compound 1 IV administration may be eligible for PO switch on Study Day 4 and onward. Patients must meet all of the following criteria to switch from IV to PO dosing of compound 1:
  Is clinically stable, as determined by the Investigator
  Is able to swallow tablets The decision to switch from IV to PO compound 1 will be based on the Investigator's discretion and can be done on any day from Day 4 onwards. Patients may be switched back to the IV treatment as needed if unable to tolerate PO medication. Oral compound 1 may be given as an outpatient.

Rationale for Dose and Schedule Selection:

In a pharmacokinetic/pharmacodynamic (PK-PD) study, immunocompromised mice were infected with 6 strains of *A. fumigatus*, inclusive of wild type, azole-resistant, and echinocandin-resistant strains. Groups of animals were dosed with compound 1 at different dose fractionations. The AUC from time 0 to 24 hours ($AUC_{(0-24)}$)/MEC ratio was determined to be the PK-PD index that best correlated with antifungal efficacy as assessed by fungal burden (conidial equivalents [CEs] measured by real time quantitative PCR) in lung homogenates. The stasis and 1-logarithm drop endpoints were defined as the quantity of *A. fumigatus* in CEs just prior to compound 1 administration compared to CEs at the endpoint of assessment at 96 hours. The median total drug AUC/MEC which achieved stasis and 1-logarithm kill endpoints for each *A. fumigatus* strain were 2801.6 and 5258.2.

The 2017 and 2018 compound 1A antifungal activity against *Aspergillus* spp. clinical isolates surveillance data show that the majority (98.5%) of *Aspergillus* isolates have MEC values of 0.008 to 0.03 µg/mL. The MEC in 90% of patients (MEC90) for *Aspergillus* isolates likely to be found in the clinical patient population under study is 0.03 µg/mL.

One dose regimen of compound 1 will be evaluated in this study. In Phase 1 studies in healthy volunteers, the dose regimen in this study was safe and well tolerated. While the study allows a switch to PO dosing as early as Day 4, the following table describes the estimated total drug $AUC_{(0-24)}$ and PTA for stasis in CE at the $MEC_{90}$ with the companion PO switch at Day 7.

| Load IV BID (Day 1 [Baseline]) | IV Maintenance QD (Days 2-7) | PO Maintenance QD (Days 8-42) | $AUC_{(0-24)}$ (Days 7/14/42) | PTAs at $MEC_{90}$ (stasis [Day 14]) |
|---|---|---|---|---|
| 1000 mg | 600 mg | 800 mg | 195/224/224 | ≥90% |

$AUC_{(0-24)}$ = area under the concentration-time curve from time 0 to 24 hours;
BID = twice daily;
IV = intravenous(ly);
$MEC_{90}$ = minimal effective concentration in 90% of patients;
PO = oral(ly);
PTA = probability of target attainment;
QD = once daily.

The dose regimen employed in this study provides a steady state AUC≥200 µg·hr/mL, which is associated with efficacy (colony count and survival benefit) in immunocompromised mice with IPA. Additionally, formal PK-PD studies demonstrated that the dose regimen has favorable PTA for the majority of isolates anticipated to be encountered in this study.

Formal PK-PD for invasive rare mold infections (e.g., *Fusarium* spp., *Scedosporium* spp., Mucorales fungi) have not yet been conducted. However, immunocompromised animal models of rare mold infections demonstrate colony count and survival benefit at AUCs provided by the dose regimen employed in this study.

Efficacy Endpoints

Primary: All-cause mortality through Day 42. Note: All-cause mortality will represent the percentage of patients who die after the first dose of study drug through Day 42 from any cause.

Secondary: Global response at EOST

Exploratory: all-cause mortality through Day 84; change from baseline in galactomannan; change from baseline in β-d-glucan.

Safety Variables:

Safety assessments will include physical examinations, vital signs, clinical laboratory evaluations, 12-lead ECGs, any other exploration, and adverse events. Evaluation of adverse events at Screening, Baseline, during Study Drug Treatment, at EOST, and 2 and 4 weeks after EOST, or Early Termination.

Results:

Population: A total of 12 patients received primary treatment. These patients all have limited treatment options based on documented/anticipated resistance, contraindication, intolerance, or lack of clinical response to standard of care (SoC) antifungal therapy, such as Amphotericin B; or they have serious underlying diseases and poor prognosis due to underlying disease and fungal infection. Most of these patients have probable invasive aspergillosis.

Response: Four patients have completed the treatment through 42 days. Four additional patients who had not completed the 42 day treatment showed early signs of response. In total, the treatment showed good response (at Day 42 or earlier) in 8 patients, with a day 42 survival observed in seven of the 12 patients treated. The five deaths observed were due to: an underlying disease/condition, such as malignancy or COPD (3 patients); progression of the fungal disease (1 patient); and unknown (1 patient). Patients also demonstrated good global response as monitored clinically and radiologically.

Expanded Access Program:

Population: A total of 15 patients with life-threatening/serious fungal infections received treatment, with slight modifications. These patients are not treatment-naive, and instead are all salvage and/or step-down from standard of care (SoC) antifungal therapy, such as Amphotericin B, and have no other treatment options. Of these patients, 12 have an invasive *Fusarium* infection, while the remaining patients have *Aspergillus/Lichtheimia* infection, *C. albicans* infection, and *L. prolificans* infection. All patients had poor/no response to SoC antifungals, such as Amphotericin B, and/or developed toxicity/intolerance to treatment. These patients show a broad range of fungal infection sites with sinus, spine, ankle, skin, eye, brain, and disseminated infections all observed. Many of these patients also have an underlying disease/condition, such as AML/ALL/MDS, SC/solid organ transplantation, or trauma.

Updates to Dosing Regimen: Seven patients received IV dosing of compound 1, and six of these seven switched to oral doses. Eight patients received oral doses only. Two patients received a higher starting dose of compound 1 (1000 mg PO QD). Additionally, eight patients received oral compound 1 at 400 mg BID rather than 800 mg QD.

Because of the nature of the patient population having no/poor response to SoC antifungals, such as Amphotericin B, there was no SoC washout period before starting treatment: Nine patients continued to receive Amphotericin B treatment for a period of time in combination with compound 1; of these, seven of nine patients stopped Amphotericin B within 15 days of start of compound 1; three patients could not stay on Amphotericin B treatment due to renal toxicity issues.

Response: Of the fourteen patients which have been on treatment long enough to evaluate response, twelve have shown a favorable response, either with a reduction in signs and symptoms of the infection, such as reductions in skin lesions, and/or radiological improvement. Seven of 11 patients who stopped Amphotericin B treatment had improvement in renal function; while renal function remained stable among the four that did not have evident improvement of renal function.

Compound 1 was generally well tolerated over extended treatment durations in patients with serious underlying morbidities.

The examples and embodiments described herein are for illustrative purposes only and various modifications or changes suggested to persons skilled in the art are to be included within the spirit and purview of this application and scope of the appended claims.

What is claimed is:

1. A method of treating a fungal infection in a human subject, the method comprising administering to a human subject with a fungal infection a therapeutically effective amount of compound 1:

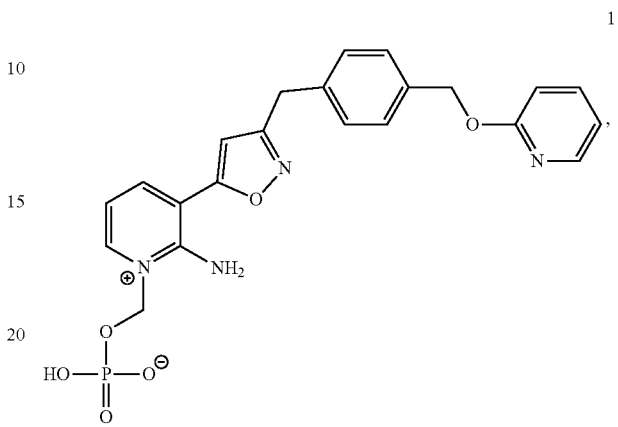

or a pharmaceutically acceptable salt, solvate, or hydrate thereof;

wherein, the fungal infection in the subject is caused by *Aspergillus* spp., *Fusarium* spp., *Paecilomyces* spp., *Purpureocillium* spp., *Dematiaceous* spp., *Rhizopus*spp., *Mucor* spp., *Lichtheimia* spp., *Cunninghamella* spp., *Acremonium* spp., *Rasamsonia* spp., *Scedosporium* spp., *Schizophyllum* spp., *Trichoderma* spp., *Alternaria* spp., *Cladophialophora* spp., *Cladosporium* spp., *Fonsecaea* spp., *Lomentospora* spp., *Phialophora* spp., *Scopulariopsis* spp., *Magnusiomyces* (*Geotrichum*) spp., *Trichosporon* spp., *Malassezia* spp., *Saprochaete* spp., *Kodamaea* spp., *Rhodotorula* spp., *Saccharomyces* spp., *Pseudozyma* spp., *Sporobolomyces* spp., *Exophiala* spp., *Lacazia* spp., *Emmonsia* spp., *Wickerhamomyces* (*Pichia*) spp., *Emergomyces* spp., *Talaromyces* spp., or Emmonsia-like fungi, or a combination thereof;

the therapeutically effective amount of compound 1 provides a steady state 24-hr Area Under the Concentration-Time Curve ($AUC_{0-24}$) of compound 1A in the subject that is greater than about 150 µg×hr/mL of compound 1A:

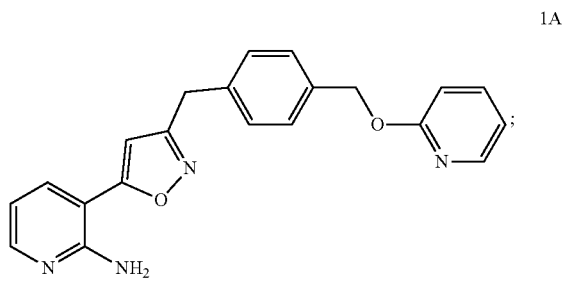 [SMILES: Nc1ncccc1-c1cc(Cc2ccc(COc3ccccn3)cc2)no1]

and the administration of compound 1, or a pharmaceutically acceptable salt, solvate, or hydrate thereof, to the subject comprises a treatment regimen comprising the daily administration of compound 1, or a pharmaceutically acceptable salt, solvate, or hydrate thereof, for at least about 4 weeks;
wherein the treatment regimen comrises a loading dose of compound 1, or a pharmaceutically acceptable salt, solvate, or hydrate thereof, and a maintenance dose of compound 1, or a pharmaceutically acceptable salt, solvate, or hydrate thereof
wherein the loading dose of compound 1, or a pharmaceutically acceptable salt, solvate, or hydrate thereof, is 2000 mg, and
wherein the maintenance dose comprises once daily administration of 600 mg to 1500 mg of compound 1, or a pharmaceutically acceptable salt, solvate, or hydrate thereof.

2. The method of claim 1, wherein the therapeutically effective amount of compound 1 provides a steady state 24-hr Area Under the Concentration-Time Curve (AUC0-24) of at least about 200 μg×hr/mL of compound 1A.

3. A method of treating a fungal disease or condition in a human subject, the method comprising administering to a human subject with a fungal disease or condition a therapeutically effective amount of compound 1:

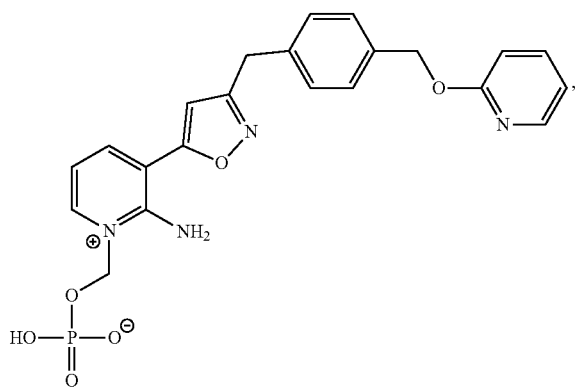

1 or a pharmaceutically acceptable salt, solvate, or hydrate thereof;
wherein,
the fungal disease or condition in the subject is aspergillosis, fusariosis, scedosporiosis, or mucormycosis, or a combination thereof;
the therapeutically effective amount of compound 1 provides a steady state 24-hr Area Under the Concentration-Time Curve ($AUC_{0-24}$) of compound 1A in the subject that is greater than about 150 μg×hr/mL of compound 1A:

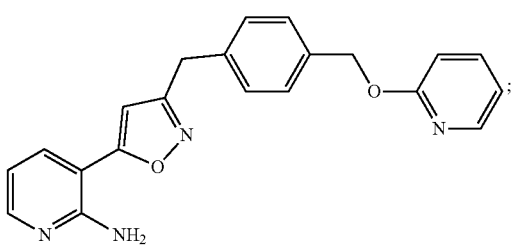

1A and
the administration of compound 1, or a pharmaceutically acceptable salt, solvate, or hydrate thereof, to the subject comprises a treatment regimen comprising the daily administration of compound 1, or a pharmaceutically acceptable salt, solvate, or hydrate thereof, for at least about 4 weeks;
wherein the treatment regimen comprises a loading dose of compound 1, or a pharmaceutically acceptable salt, solvate, or hydrate thereof, and a maintenance dose of compound 1, or a pharmaceutically acceptable salt, solvate , or hydrate thereof
wherein the loading dose of compound 1, or a pharmaceutically acceptable salt, solvate, or hydrate thereof, is 2000 mg, and
wherein the maintenance dose comprises once daily administration of 600 mg to 1500 mg of compound 1, or a pharmaceutically acceptable salt, solvate, or hydrate thereof.

4. The method of claim 3, wherein the therapeutically effective amount of compound 1 provides a steady state 24-hr Area Under the Concentration-Time Curve (AUC0-24) of at least about 200 μg×hr/mL of the compound 1A.

5. The method of claim 1, wherein each loading dose of compound 1, or a pharmaceutically acceptable salt, solvate, or hydrate thereof, is administered to the subject by intravenous (I.V.) infusion over about 30 minutes to about 4 hours.

6. The method of claim 5, wherein each dose of the loading dose comprises about 1000 mg of compound 1, or a pharmaceutically acceptable salt, solvate, or hydrate thereof.

7. The method of claim 6, wherein the loading dose comprises administration of about 1000 mg of compound 1, or a pharmaceutically acceptable salt, solvate, or hydrate thereof, to the subject by intravenous (I.V.) infusion followed by a second administration of about 1000 mg of compound 1, or a pharmaceutically acceptable salt, solvate, or hydrate thereof, to the subject by intravenous (I.V.) infusion within about 24 hours of the first infusion.

8. The method of claim 1, wherein the maintenance dose is administered once daily starting on the second day of treatment.

9. The method of claim 8, wherein the maintenance dose of compound 1, or a pharmaceutically acceptable salt, solvate, or hydrate thereof is administered over a period of about 30 minutes to about 4 hours by I.V. infusion starting on the second, third, or fourth day of treatment.

10. The method of claim 8, wherein the maintenance dose of about 600 mg to about 1200 mg compound 1, or a pharmaceutically acceptable salt, solvate, or hydrate thereof is administered over a period of about 30 minutes to about 4 hours by I.V. infusion starting on the second, third, or fourth day of treatment.

11. The method of claim 8, wherein the maintenance dose of compound 1, or a pharmaceutically acceptable salt, solvate, or hydrate thereof is administered orally to the subject starting on the second, third, or fourth day of treatment.

12. The method of claim 8, wherein the maintenance dose of about 800 mg to about 1000 mg compound 1, or a pharmaceutically acceptable salt, solvate, or hydrate thereof is administered orally once daily to the subject starting on the second, third, or fourth day of treatment.

13. The method of claim 8, wherein, starting on the second, third, or fourth day of treatment:
   a) about 600 mg to about 900 mg of compound 1, or a pharmaceutically acceptable salt, solvate, or hydrate thereof is administered over a period of about 30 minutes to about 3 hours by I.V. infusion; or
   b) about 800 mg to about 1000 mg of compound 1, or a pharmaceutically acceptable salt, solvate, or hydrate thereof is administered orally once daily.

14. The method of claim 8, wherein:
   starting on the second day of treatment, about 600 mg to about 900 mg of compound 1, or a pharmaceutically acceptable salt, solvate, or hydrate thereof is administered over a period of about 30 minutes to about 3 hours by I.V. infusion; and
   starting on the fourth day of treatment:
   a) about 600 mg to about 900 mg of compound 1, or a pharmaceutically acceptable salt, solvate, or hydrate thereof is administered over a period of about 30 minutes to about 3 hours by I.V. infusion; or
   b) about 800 mg to about 1000 mg of compound 1, or a pharmaceutically acceptable salt, solvate, or hydrate thereof is administered orally once daily.

15. The method of claim 3, wherein:
   the treatment regimen comprises the daily administration of compound 1, or a pharmaceutically acceptable salt, solvate, or hydrate thereof, for about 4 weeks to about 12 weeks.

16. The method of claim 3, wherein:
   the treatment regimen increases the chances of survival for the subject, decreases galactomannan levels in the subject, decreases β-d-glucan levels in the subject, or a combination thereof.

17. The method of claim 1, wherein the fungal infection is a mold infection.

18. The method of claim 17, wherein the mold infection is caused by *Aspergillus* spp., *Scedosporium* spp., *Fusarium* spp., *Lomentospora* spp., *Paecilomyces* spp., *Purpureocillium* spp., *Dematiaceous* spp., or Mucorales fungi, or a combination thereof.

19. The method of claim 17, wherein the mold infection is caused by *Aspergillus* spp., *Scedosporium* spp., *Fusarium* spp., *Lomentospora* spp., or Mucorales fungi.

20. The method of claim 17, wherein the mold infection is caused by *Aspergillus* spp., *Scedosporium* spp., *Fusarium* spp., or Mucorales fungi.

21. The method of claim 17, wherein the mold infection is caused by *Aspergillus* spp.

22. The method of claim 17, wherein the mold infection is caused by *A. fumigatus*.

23. The method of claim 17, wherein the mold infection is caused by *Lomentospora* spp.

24. The method of claim 17, wherein the mold infection is caused by *Scedosporium* spp.

25. The method of claim 17, wherein the mold infection is caused by *Fusarium* spp.

26. The method of claim 17, wherein the mold infection is caused by Mucorales fungi.

27. The method of claim 17, wherein the mold infection is caused by an azole-resistant mold.

28. The method of claim 17, wherein the mold infection is caused by azole-resistant *Aspergillus* spp.

29. The method of claim 17, wherein the mold infection is caused by azole-resistant *A. fumigatus*.

30. The method of claim 17, wherein the mold infection is an echinocandin-resistant mold.

31. The method of claim 17, wherein the mold infection is an invasive mold infection.

32. The method of claim 17, wherein the mold infection is invasive aspergillosis.

33. The method of claim 17, wherein the mold infection is an invasive infection of the eye and/or central nervous system.

34. The method of claim 17, wherein:
   the loading dose comprises administration of about 1000 mg of compound 1, or a pharmaceutically acceptable salt, solvate, or hydrate thereof, to the subject by intravenous (I.V.) infusion followed by a second administration of about 1000 mg of compound 1, or a pharmaceutically acceptable salt, solvate, or hydrate thereof, to the subject by intravenous (I.V.) infusion within about 24 hours of the first infusion; and wherein starting on the second day of treatment, about 600 mg to about 900 mg of compound 1, or a pharmaceutically acceptable salt, solvate, or hydrate thereof is administered over a period of about 30 minutes to about 3 hours by I. V. infusion; and
   starting on the fourth day of treatment:
   a) about 600 mg to about 900 mg of compound 1, or a pharmaceutically acceptable salt, solvate, or hydrate thereof is administered over a period of about 30 minutes to about 3 hours by I. V. infusion; or
   b) about 800 mg to about 1000 mg of compound 1, or a pharmaceutically acceptable salt, solvate, or hydrate thereof is administered orally once daily.

35. The method of claim 34, wherein the mold infection is caused by *Aspergillus* spp., *Scedosporium* spp., *Fusarium* spp., or Mucorales fungi.

36. The method of claim 35, wherein the therapeutically effective amount of compound 1 provides a steady state 24-hr Area Under the Concentration-Time Curve ($AUC_{0-24}$) of at least 200 µg×hr/mL of compound 1A.

37. The method of claim 1, wherein the compound 1, or a pharmaceutically acceptable salt, solvate, or hydrate thereof is administered in combination with an additional antifungal agent.

38. The method of claim 37, wherein the additional antifungal agent is an azole antifungal agent or an echinocandin antifungal agent.

39. The method of claim 10, wherein the maintenance dose of about 600 mg to about 1200 mg compound 1, or a pharmaceutically acceptable salt, solvate, or hydrate thereof is administered over a period of about 30 minutes to about 4 hours by I.V. infusion starting on the second day of treatment.

40. The method of claim 12, wherein the maintenance dose of about 800 mg to about 1000 mg compound 1, or a pharmaceutically acceptable salt, solvate, or hydrate thereof is administered orally once daily to the subject starting on the fourth day of treatment.

* * * * *